(12) United States Patent
Deutsch

(10) Patent No.: US 8,589,376 B2
(45) Date of Patent: Nov. 19, 2013

(54) METHOD AND APPARATUS TO SEARCH DATA AND NOTIFY AND UPDATE A USER

(76) Inventor: Larry Deutsch, Cupertino, CA (US)

( * ) Notice: Subject to any disclaimer, the term of this patent is extended or adjusted under 35 U.S.C. 154(b) by 0 days.

(21) Appl. No.: 13/373,600

(22) Filed: Nov. 21, 2011

(65) Prior Publication Data

US 2012/0150882 A1     Jun. 14, 2012

Related U.S. Application Data

(60) Provisional application No. 61/458,442, filed on Nov. 23, 2010.

(51) Int. Cl.
*G06F 17/30*         (2006.01)

(52) U.S. Cl.
USPC ............ 707/706; 707/708; 707/755; 707/783

(58) Field of Classification Search
USPC ................... 707/706, 755, 803, 708; 725/32, 725/135–136
See application file for complete search history.

(56) References Cited

U.S. PATENT DOCUMENTS

| | | | |
|---|---|---|---|
| 7,711,738 B1 * | 5/2010 | Kraft et al. | 707/752 |
| 2002/0138617 A1 * | 9/2002 | Christfort et al. | 709/225 |
| 2004/0003351 A1 * | 1/2004 | Sommerer et al. | 715/517 |
| 2004/0249800 A1 * | 12/2004 | Lu | 707/3 |
| 2005/0165829 A1 * | 7/2005 | Varasano | 707/102 |
| 2005/0257400 A1 * | 11/2005 | Sommerer et al. | 36/13 |
| 2007/0204285 A1 * | 8/2007 | Louw | 725/14 |
| 2008/0104633 A1 * | 5/2008 | Noblecourt et al. | 725/32 |
| 2009/0300120 A1 * | 12/2009 | Schmidt | 709/206 |
| 2010/0094878 A1 * | 4/2010 | Soroca et al. | 707/748 |
| 2010/0257569 A1 * | 10/2010 | O'Hanlon | 725/110 |
| 2010/0325107 A1 * | 12/2010 | Kenton et al. | 707/723 |

* cited by examiner

*Primary Examiner* — Hanh Thai
(74) *Attorney, Agent, or Firm* — David Tichane

(57) ABSTRACT

The present invention allows a user to subscribe to multiple concurrent channels of syndicated content published over the internet. The user receives notification of the content which is new since the previous time that the user accessed a channel. The user can select the frequency of checking for new content and the user can specify how far back in time to check. In addition, the user can specify a maximum number of changes to be presented.

24 Claims, 22 Drawing Sheets

METHOD AND APPARATUS TO SEARCH DATA AND NOTIFY AND UPDATE A USER

CROSS REFERENCE TO RELATED APPLICATIONS

This application claims the benefit under 35 USC 119(e) of U.S. Provisional Application No. 61/458,442 filed Nov. 23, 2010 by Larry Deutsch, which is incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

REFERENCE TO COMPUTER PROGRAM LISTING APPENDIX

This application includes a computer program listing appendix submitted on compact disc, which is hereby incorporated herein by reference. The total number of compact discs submitted herewith including identical duplicates is two.

FIELD OF THE INVENTION

Broadly stated, disclosed in some embodiments is a method and apparatus for searching a community/classified posting service.

BACKGROUND OF THE INVENTION

Community/classified posting internet sites, on which users publish items for sale or make notifications and related web content available publicly, are popular. Tens of millions of people make tens of billions visits every month to these sites. Sections on the these sites may be devoted to jobs and resumes, housing, personals, items for sale, services, community issues, gigs and entertainment, and discussion forums.

SUMMARY OF THE INVENTION

In one embodiment of the invention, an application, commonly referred to as an "app," is described. The app preferably runs on a mobile device, such as a mobile (cellular) telephone, a tablet device, a notebook computer, or a laptop computer. The purpose of the app is to connect to a community/classified posting site, search for items using user specified sections and keywords, parse information relating to the items, select relevant data, and display selected data in a format suitable for viewing on the particular device. In addition, the app optionally can run in the background, monitoring the site for newly posted information, and informing a user of a new item. This background search permits the user to respond in a rapid and timely way to an item as it becomes available, thus maximizing the user's chances of obtaining it.

In more technical language, some embodiments of this app permit the user to subscribe to multiple concurrent channels of syndicated content published over the internet. A web services application programming interface (API) such as simple object access protocol (SOAP) is not required to be supported by the posting service. Instead, the method disclosed herein relies on a combination of web harvesting (e.g., markup language scraping) and parsing of syndicated content to extract and associate data from the posting service. The user receives notification of the content which is new since the previous time that the user accessed a channel. The user can select the frequency of checking for new content while the app conducts a background search. And the user can specify how far back in time to check for content. In addition, the user can specify a maximum number of changes to be presented.

Such an app has to overcome numerous obstacles. For example, mobile devices may have batteries of limited capacity and life, may have limited size displays, and may have limited computing memory and power. In addition, there may be network and communication issues such as limited bandwidth and unreliable network connections.

Referring to FIG. 10, a sample device display shows how, in one embodiment, the user may set up a search, via the device, of items available on the posting site. Preferably, a graphic user interface for the device comprises menu selectors such as icons, tabs, and pull down widgets.

Selector 1210, as described above, notifies the user that new search results are available. A status indicator 1305 may indicate that the device is performing background searches and show the time interval between each search.

One embodiment of the display shown in FIG. 10 is a selector 1310 that facilitates a search of the posting site. The selector 1310 brings up a screen and interface that shows search options and allows the user to enter parameters for an immediate search or a background search.

Location selector 1320 brings up a screen (not shown) and interface that allows the user to narrow search results to items located within a specific geographic area. This location may be saved as a favorite accessible by selector 1370.

Favorites selector 1330 brings up a screen (not shown) and interface that may allow the user to select previously saved search requests, to access bookmarked search results, and to perform the following operations:

Notify other users of search request or results via email, short messaging service (SMS) messages (e.g., text messages), or other communication modes
Contact item poster via email, SMS messages, or telephone
Respond to posting service
Display a geographic map of the location of posted item
Submit an auction bid The search keyword selector option 1340 allows the user to enter a keyword to narrow search results to those posted items whose descriptions contain the keyword.

Search category selector option 1350 allows the user to enter a general category (such as "free," "for sale," or "for lease") to narrow search results to those posted items within the category.

Search sub-category selector option 1360 allows the user to enter a specific category (in this example "boats") to narrow search results to those posted items within the sub-category.

Favorite location selector 1370 allows the user to choose a geographic area previously saved by invoking selector 1320 (see above). Selector 1320 or 1370 optionally may access a current location of the user via global positioning satellite or other geo-location mechanism to use as a favorite.

Filter selector option 1380 allows the user to further narrow search results to parameters (in this example minimum price and maximum price) within a range or other specifications.

Search selector 1390 allows the user to initiate an immediate search. A screen displaying results, as shown in FIG. 11 in one embodiment, may automatically appear.

View results selector 1392 allows the user to view the results of a background search.

Search preferences selector 1394 directs the user to one or more screens (not shown) that allow the user to display and edit various search parameters such as, in some embodiments:

Enable or disable display of thumbnails on a result screen (such as shown in FIG. 11)

Specify a maximum number of search results to return

Specify a look-back time interval (e.g., do not return items posted before a specified time)

Enable or disable background searches for newly posted items

Enable or disable visual, audible, or tactile forms of notification of new results Set a time interval between each background search The time between search intervals is a trade-off, in some embodiments, between receiving search results as soon as possible after postings are listed and extending battery life of the device. The shorter the period between search intervals, the larger the drain on a battery. However, the longer the interval, the less likely the user will be able to submit a quick enough response to obtain a posted item. Obviously, this tradeoff not a factor for plugged in devices.

Another selector, a clear saved data option (not shown), may direct the user to one or more screens (not shown) that allow the user, in some embodiments, to perform one or more of the following functions:

Delete background search results

Delete favorite search requests

Delete preferred locations

Delete bookmarks and/or bookmarked results

Clear web cache

Referring to FIG. 11, a sample device display shows how, in one embodiment, the app may display search results, gathered from a posting site, to the user.

Notification selector 1210, when displayed, indicates to the user that new search results are available on the device. This app permits background searches to be performed at periodic intervals while other app's and functions are running on the device. Selector 1210 may appear on a status line while the user is running another app, while using the device for a phone call, or while the device is in idle mode. In addition to a visual selector, the user may be notified of new search results by a sound (e.g. a ring tone) or a vibration, for example. Upon receiving selector 1210, the user may review updated search results.

Optional image thumbnail 1220 displays a photograph, picture, or drawing on the device of an item (e.g. a good or service), offered on the posting site, selected from a user specified category and/or keyword. Reasons that the thumbnail 1220 may not be shown include lack of a photograph, picture, or drawing of the item on the posting site, a user decision not to show thumbnails on the device (which can reduce the size of data to be communicated from the posting site to the device and save memory on the device), image is too big to download, target website temporary not responding, temporary loss of communications, and lack of relevance of a thumbnail to the requested information.

Contents 1230 include details of the posted item. Specifically, contents 1230 may include title of the item, date and time posted, price, description, location, and condition. The most relevant details may include a short summary description and date. By "clicking" on the details, the user may select the item to display a full posting. The user may scroll through multiple postings, if they exist.

Aspects of this specification, comprising routines and data structures, in addition to contributing to the operation of the app, are relevant to other types of apps. One embodiment of the invention, included in Appendix A, comprises Java and XML user interface specifications.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
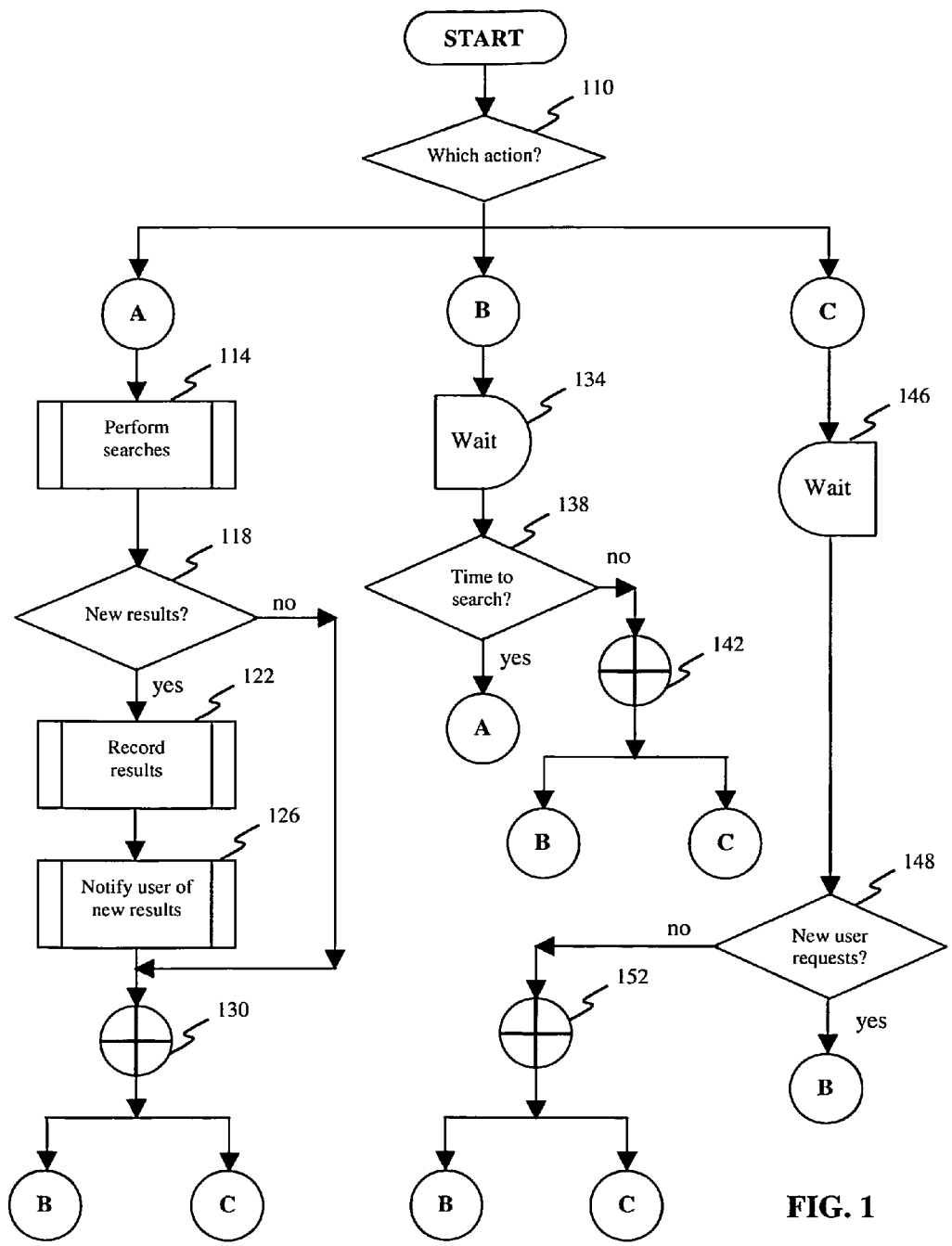
FIG. 1 is a high level diagram of a method implementing the invention according to one embodiment.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

As used in this application, the generic term "content reference" includes the concept of uniform resource locator (URL) and equivalents.

As used in this application, the generic term "markup language" includes the concept of hyper-text markup language (HTML) and equivalents.

As used in this application, the generic term "syndicated content" includes the concept of RDF Site Summary (RSS) sometimes known as "really simple syndication" and equivalents. "RSS" is a family of web feed formats used to publish frequently updated works. RSS is a web content syndication format that is a dialect of XML 1.0. The RSS 2.0 specification was released through Harvard under a Creative Commons license on Jul. 15, 2003 which is available on the internet at the cyber law Harvard RSS website.

As used in this application, the term "data store" includes but is not limited to the concept of a database. A data store may be any type of information depository known in the art accessible by data processing apparatus.

Figure 9:
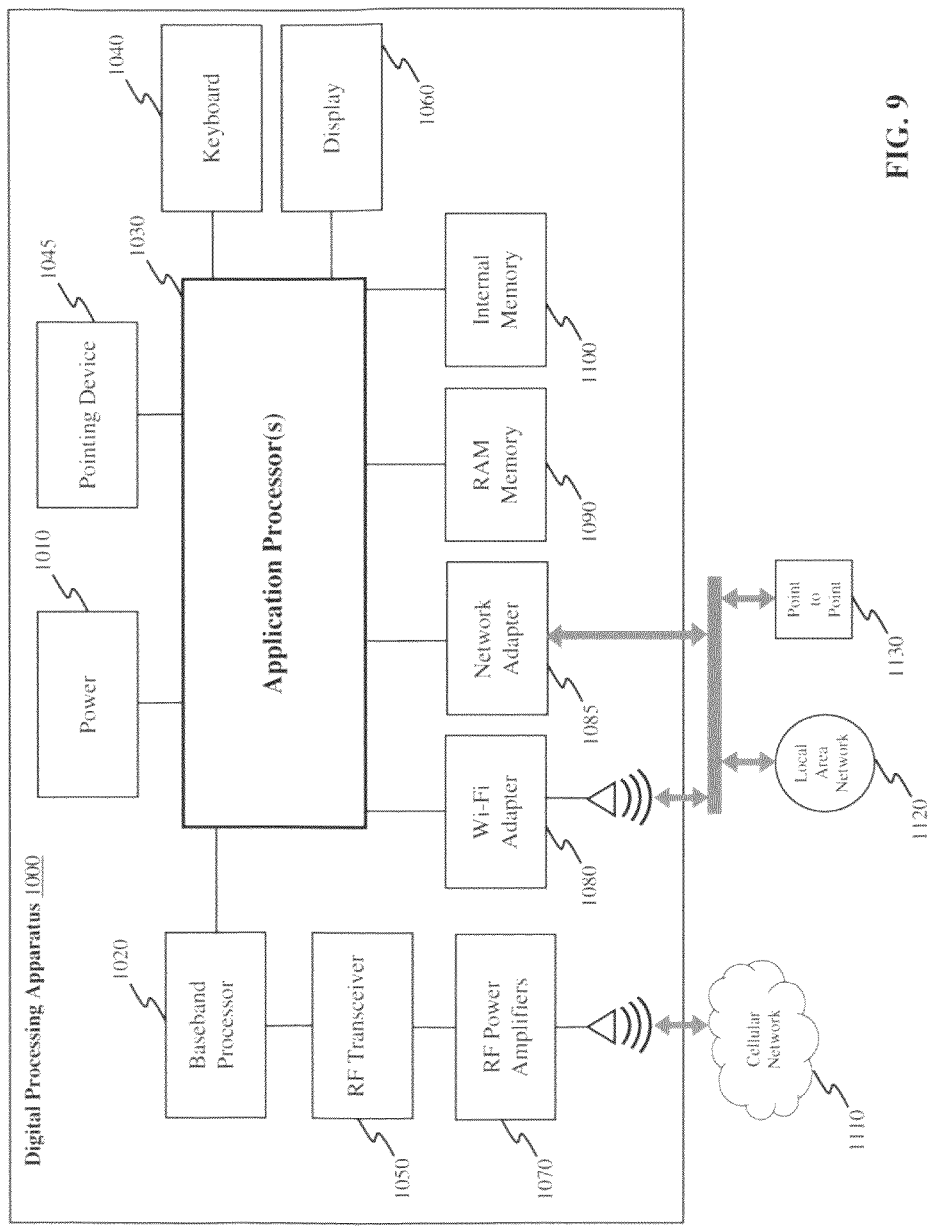
FIG. 9 is a block diagram of an apparatus configured to perform features of the invention according to one embodiment.
Figure 10:
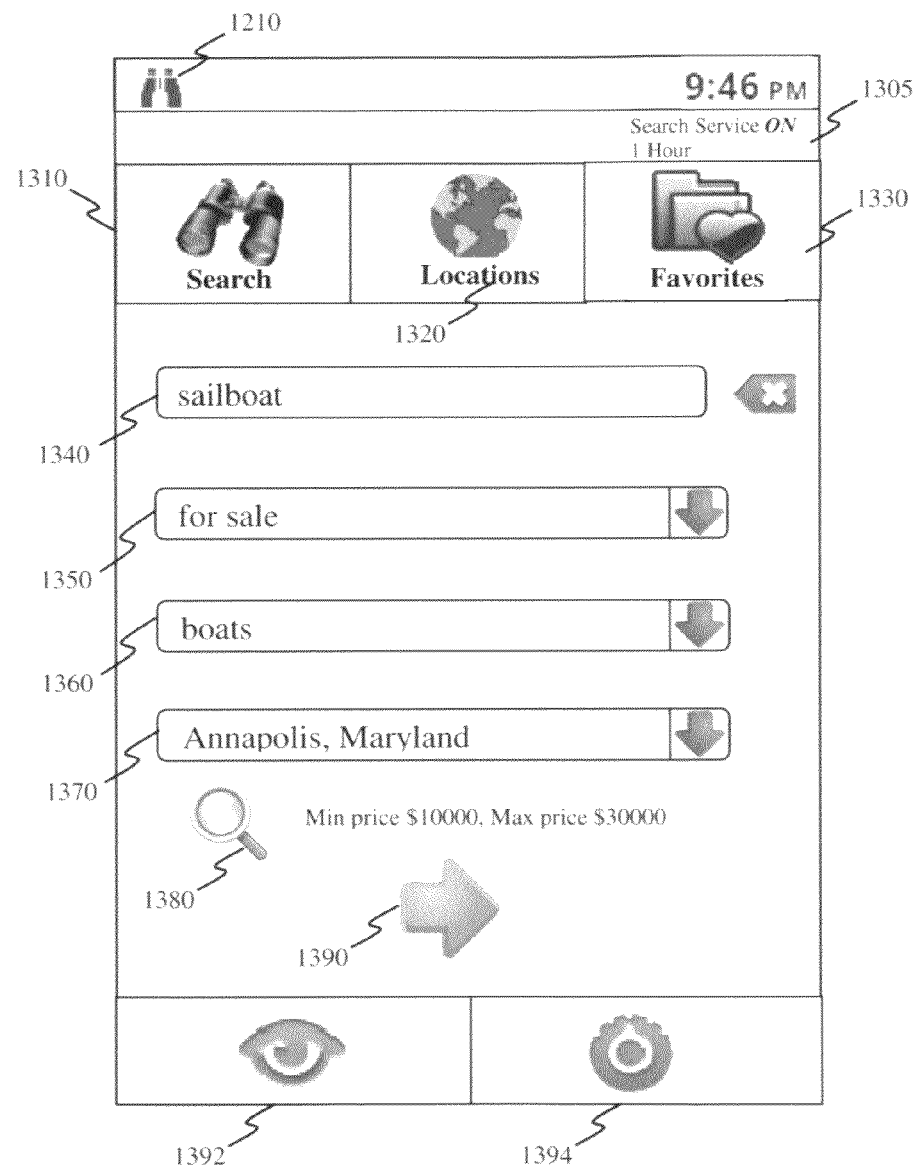
FIG. 10 is a diagram of a user interface for controlling the apparatus to perform a search of the posting service.

Referring initially to FIG. 9, a system is shown which includes a digital processing apparatus 1000. This system is preferably a mobile device (such as a cellular telephone, notebook computer, tablet computer, or laptop computer). The example apparatus in FIG. 9 includes provision for input power 1010 (such as a battery and power management IC), application processor(s) 1030, RAM memory 1090, and internal memory 1100 (e.g., non-volatile memory such as flash memory, hard drive, CD-ROM drive, or DVD drive). Communications may be provided by optional network adapter 1085, and/or optional Wi-FI adapter 1080, to a local area network 1120 or to a point-to-point network 1130. In addition, optional connectivity to cellular network 1110 may be provided via baseband processor 1020 (a CPU that manages cellular network 1110 communications), transceiver 1050 which handles the broadcast and reception of radio signals with network or subscriber equipment, and one or more power amplifiers 1070 which increase signal power up to levels required for wireless communication.

Electronic visual display 1060 typically comprises an LCD touch screen and preferably supports graphics. Data input may be through one or more of the following agencies: keyboard 1040 (soft or hard), touch interface or pointing device 1045, voice (not shown), disk storage (optionally comprising internal memory 1100), local area network 1120, point-to-point network 1130, and cellular network 1110.

One or more features of the computer as shown may be omitted while still permitting the practice of the invention. For example, apparatus pointing device 1045, such as a mouse, is not required where the apparatus 1000 is a cellular telephone.

Figure 12:
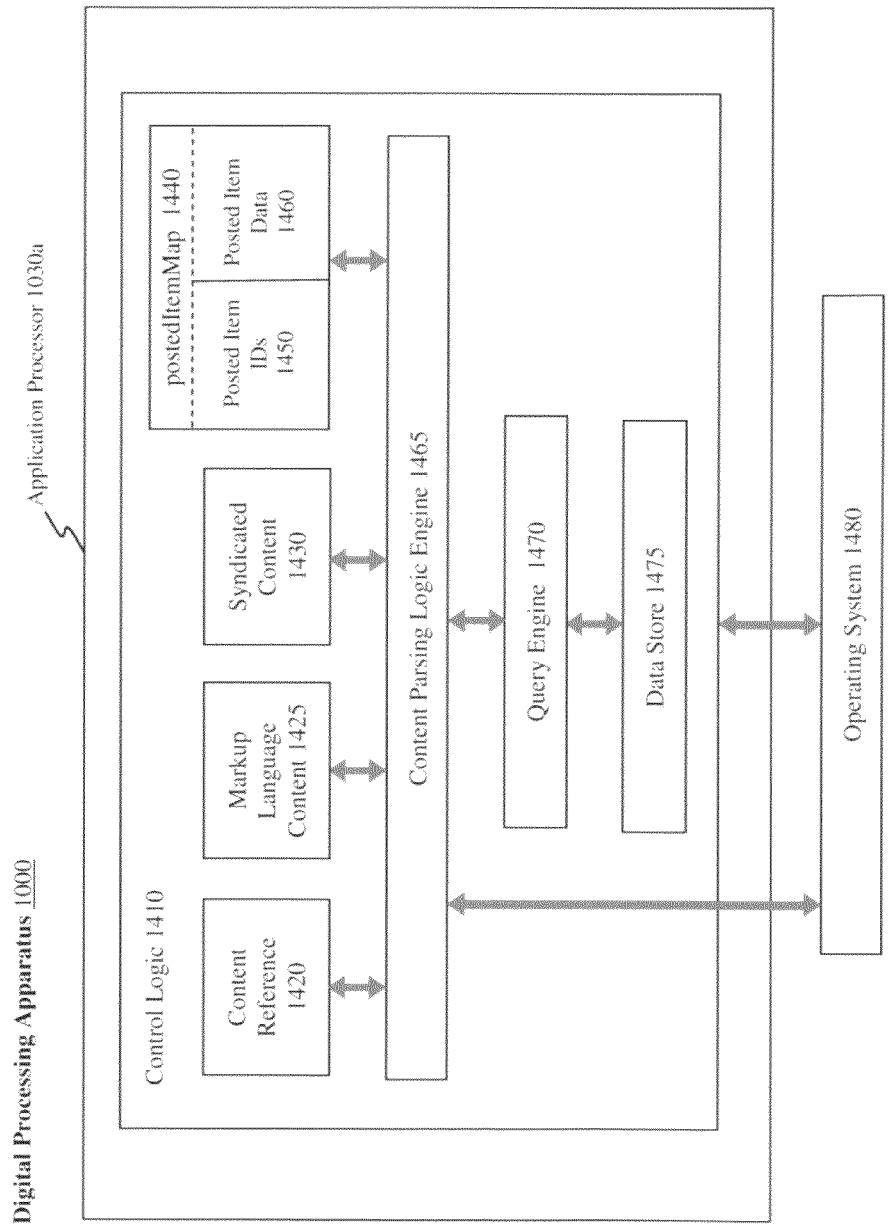

FIG. 12 is a block diagram of a system configured to execute some embodiments of the invention. Digital processing apparatus 1000 includes operating system 1480. Apparatus 1000 also comprises an application processor 1030a which in turn comprises control logic 1410. Operating system 1480 is in communication with data store 1475 (which may include but is not limited to a database). In addition, operating system 1480 is in communication with content parsing logic engine 1465. Data store 1475 is in communication with query engine 1470, such as a SQL based query system. In turn, query engine 1470 is in communication with content parsing logic engine 1465.

Content parsing logic engine 1465 generates a content reference 1420 based on user selected and/or defined preferences (e.g., parameters saved in data store 1475). Then engine 1465 uses reference 1420 in executing a first query on posting site to retrieve markup language content 1425. Next, the engine 1465 generates map 1440 where posting site item identifiers 1450 are mapped to item data 1460. The engine then uses content reference 1420 in its execution of a second query of the posting site to retrieve syndicated content 1430. This content is used to generate information to be included in appropriate item data 1460 locations resulting in a modified map 1440.

The content parsing logic engine passes the modified map 1440 to the query engine 1470 which in turn stores these results in data store 1475, if the search is a background search. Otherwise, if the search is a foreground search, these results are displayed to the user.

The flow charts herein illustrate the structure of the logic of the present invention as embodied in computer program software. Those skilled in the art will appreciate that the flow charts illustrate the structures of logic elements, such as computer program code elements or electronic logic circuits which function according to this invention. Manifestly, the invention is practiced in its essential embodiment by a machine component that renders the logic elements in a form that instructs digital processing apparatus 1000 (that is, a computer) to perform a sequence of function steps corresponding to those shown.

Logic elements may be contained on a computer program product which includes but is not necessarily limited to a disk, volatile or non-volatile memory, flash memory, and ROM for storing program modules. Program modules may comprise a computer program that is executed by processor(s) 1030 within the apparatus 1000 as a series of computer-executable instructions. In an illustrative embodiment of the invention, the computer-executable instructions may be lines of compiled Java code.

FIG. 1 is a high level view of a foreground and background search method. Step 110 is a scheduler that decides which action to perform. Options include performing a foreground or background search at step 114, accepting user requests at step 146, or entering a sleep state 134 prior to running a search.

Figure 2A:
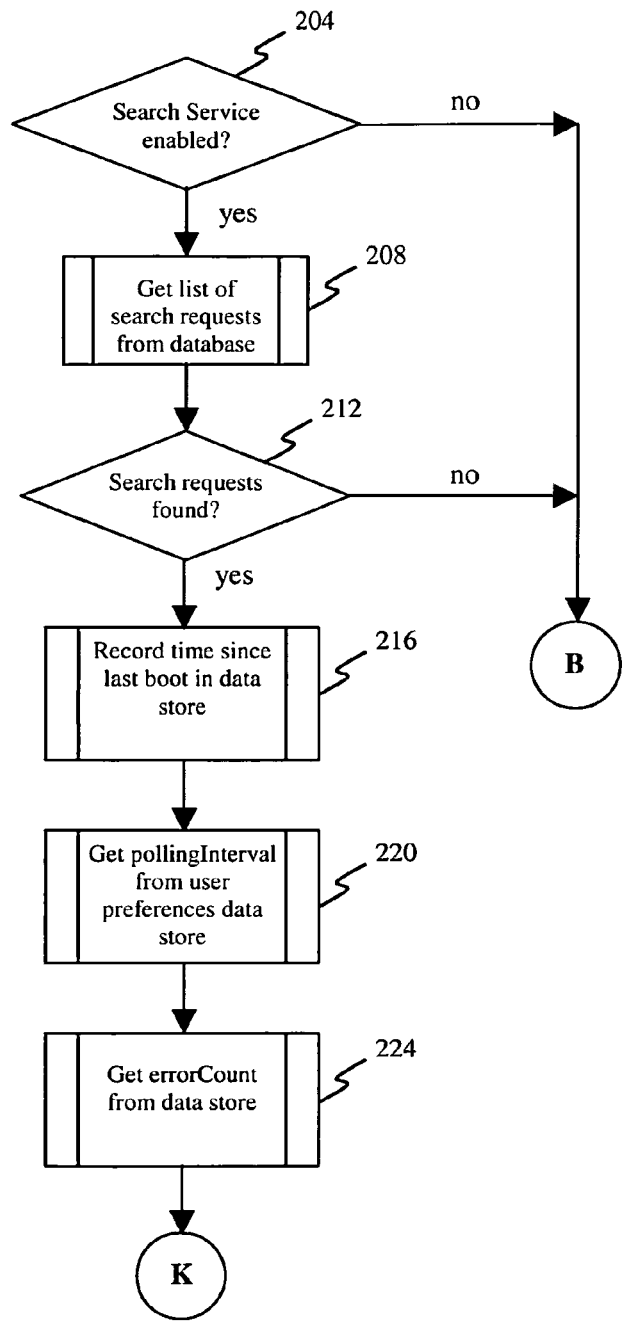
FIGS. 2A and 2B combined is a diagram of a method of performing a background search of a community/classified posting service.
Figure 2B:
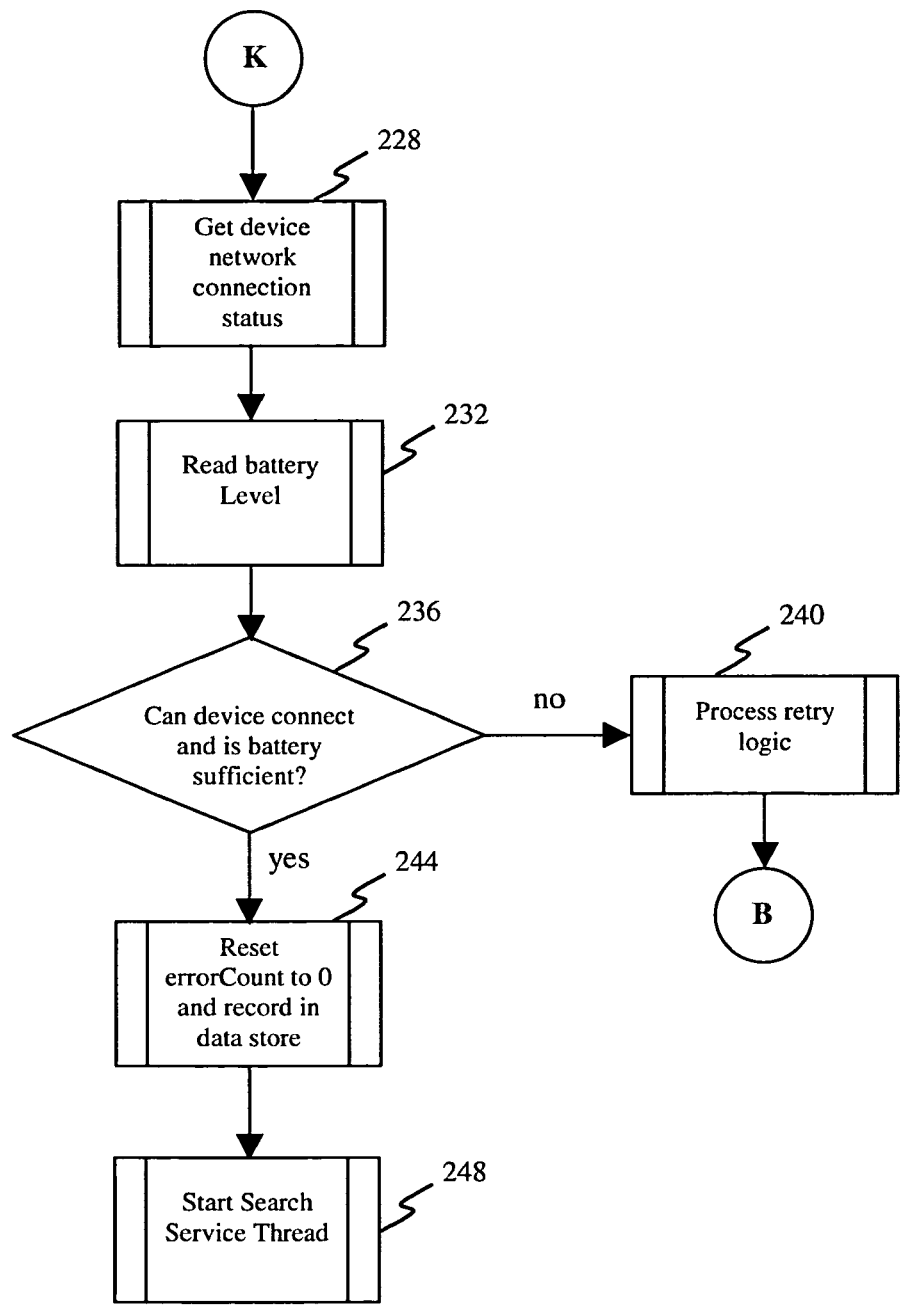

Step 114 is a high level representation of a method for initiating a search (shown in detail in FIGS. 2A and 2B). At step 118, if new search results are found, they are processed. Otherwise, proceed to step 130 which in turn proceeds to sleep state 134 or to a wait state for user input at step 146.

Figure 8A:
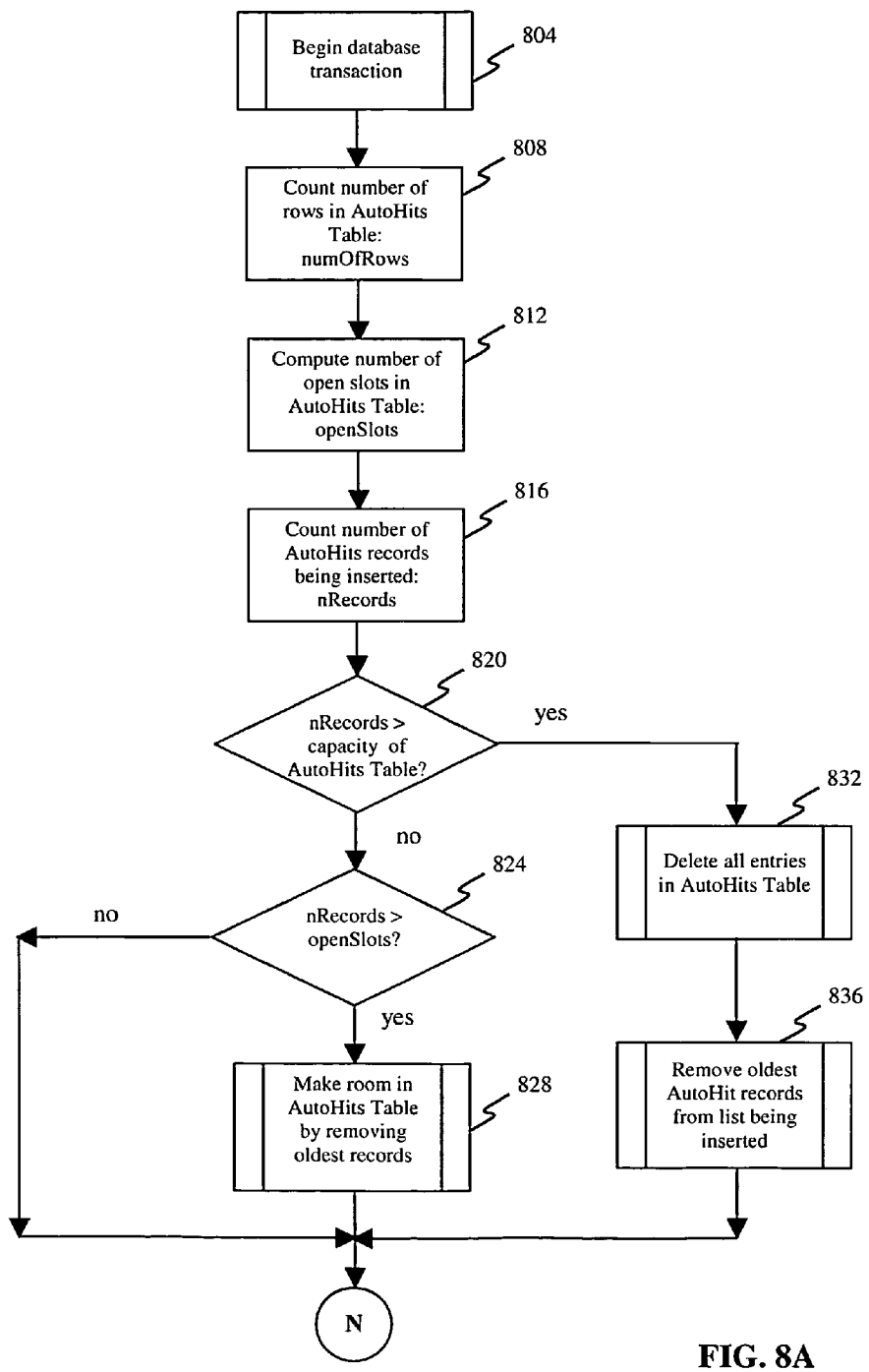
FIGS. 8A and 8B is a procedure to store the search results in a table.
Figure 8B:
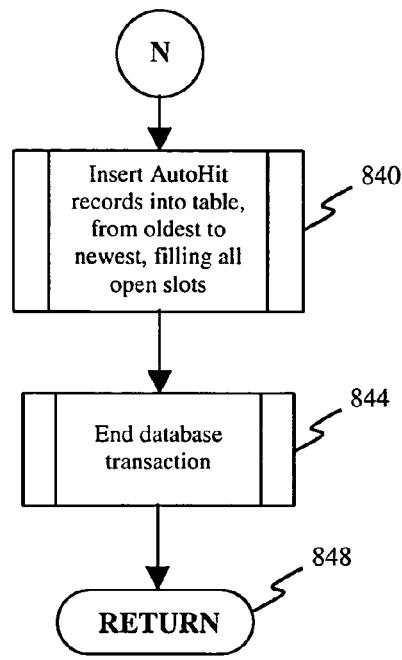

If there are new results at step 118, record the results in a table at step 122 that executes the steps 804 to 844 (returning to step 122 at step 848) (see FIGS. 8A and 8B and accompanying description). Then the user is notified of new results at step 126 that executes the steps 440 to 456 (returning to step 126 at step 460) (see FIG. 4B and accompanying description). This notification, in some embodiments, can be a display of a selector in a status area, a sound, a vibrate alarm, or notification "widget" on the user's home screen. As defined in the internet online service Wikipedia: "In computer programming, a widget (or control) is an element of a graphical user interface (GUI) that displays an information arrangement changeable by the user, such as a window or a text box. The defining characteristic of a widget is to provide a single interaction point for the direct manipulation of a given kind of data. In other words, widgets are basic visual building blocks which, combined in an application, hold all the data processed by the application and the available interactions on this data."

Some embodiments of this invention display search results via a widget on a pop up window while the user is executing other applications.

Upon exiting sleep state 134 (when it is time to search), the process proceeds to step 114. Otherwise a decision is made to either proceed to sleep state 134 again or to wait state step 146. Upon exiting the wait state step 146, it is determined at step 148 whether there is a new user request. If there is a request, the process proceeds to sleep state 134 to wait for the next time to search. Otherwise, the process may proceed either to wait again for user input at step 146 or to sleep state 134 for the next time to search.

In FIGS. 2A and 2B, step 114 is detailed. At step 204, if the search service is enabled proceed to step 208 to continue with the search. Otherwise, return to the sleep state 134. At step 208, a list is obtained of search request objects from a data set. These are searches and associated criteria input by the user.

Typically, search request objects would be stored in a relational database, but this is not required. A search request object comprises:
1. A short description of the request
2. The content reference for the request
3. Filters for the search (e.g. price ranges, age limits, square footage, etc.)
4. Search category (e.g. for sale, housing, services, etc.)
5. Auto search enabled flag (true if the search should be run in the background, false otherwise)
6. Last hit time (calendar time of the most recent match from the previous search)
7. Identifier for the last item that was successfully matched. The identifier can be a content reference or other string that is unique for the posting service.

After completing step 208, a decision is made at step 212 whether search request objects are found. If not, the process proceeds back to sleep state 134. If search requests objects are found, at step 216 the process records time since last boot in a data store.

The data store can be on a file system, or some other data storage mechanism. The data can be represented a simple name-value pair association. A battery operated device can go into "Deep Sleep" mode to save battery life. The time since last boot is the absolute amount of time since the device was lasted powered on, and includes the time that the device was in Deep Sleep mode. This time is used to determine when to schedule the service to run, and is used in process retry logic step 240 (shown in detail in FIGS. 3A and 3B).

The process at step 220 obtains polling time interval, according to user preference, from the data store. The polling interval is specified by the user as the number of hours and seconds in which to periodically run the automatic searches.

The process at step 224 obtains an error count. The error count is the number of failed attempts to contact the server data feed since the last successful connection. This is used in the process retry logic at step 240.

The process determines at step 228 the ability of the device to connect to the network. The network comprises the cellular network 1110, the local area network 1120, the point-to-point network 1130.

The process at step 232 reads battery status from the device. This would typically be the percentage of maximum capacity remaining on the device.

The process at step 236 decides if the device can connect to the network. If not, the process performs the process retry logic at step 240. Also the process performs the process retry logic step 240 if the battery capacity is insufficient. Battery sufficiency can be determined by processing the charging status and the capacity remaining on the device. The result of a step 240 operation determines when to the schedule the next attempt to connect to the network and execute background search processing.

If the process at step 236 decides that the device can connect to the network, the process proceeds to reset error count at step 244. The error count is reset to a value, such as zero, which indicates that no errors are outstanding. The value is saved in a data store for the next time that the background search is executed.

Figure 4A:
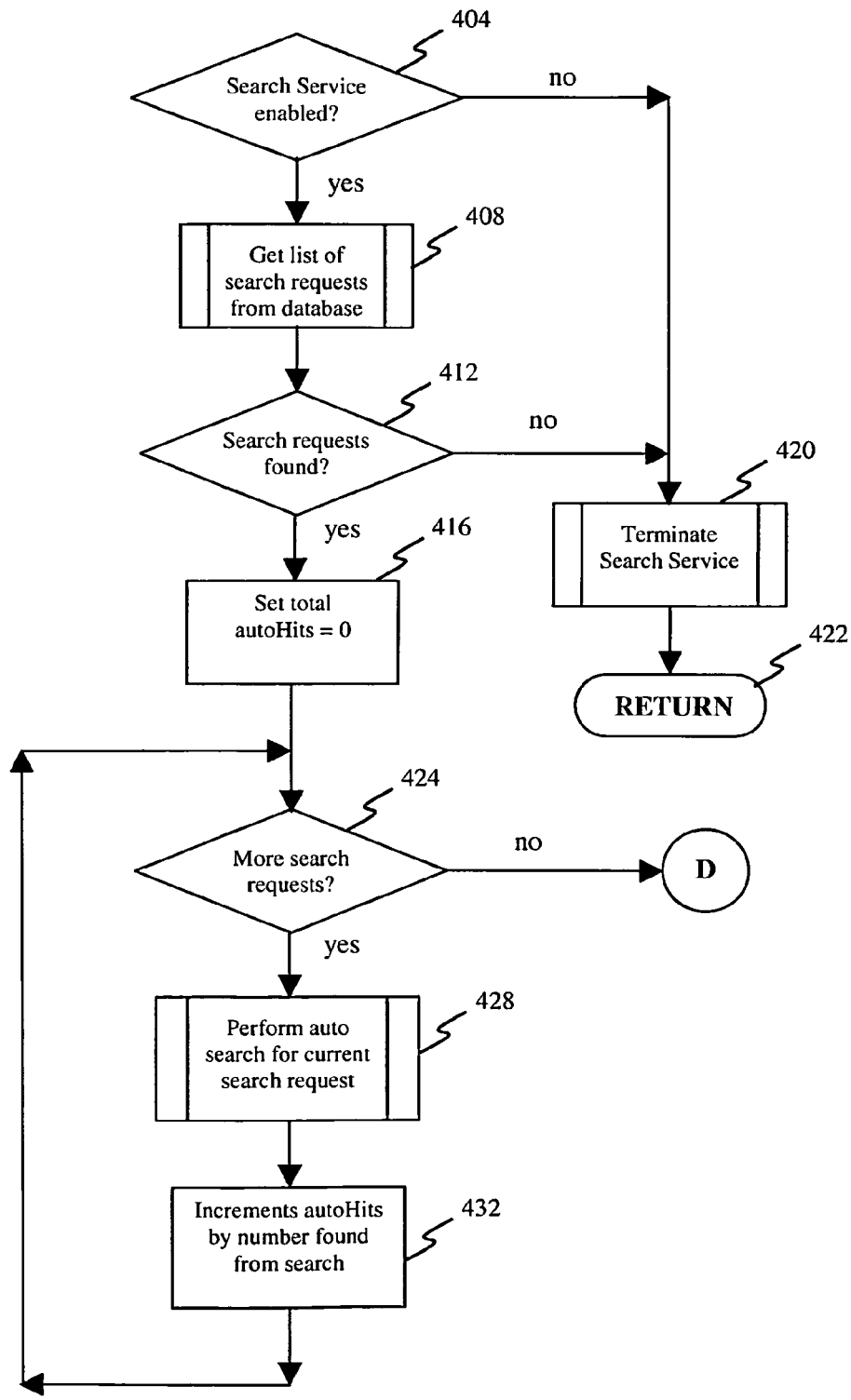
FIGS. 4A and 4B combined is a diagram of an asynchronous thread to perform multiple search requests.
Figure 4B:
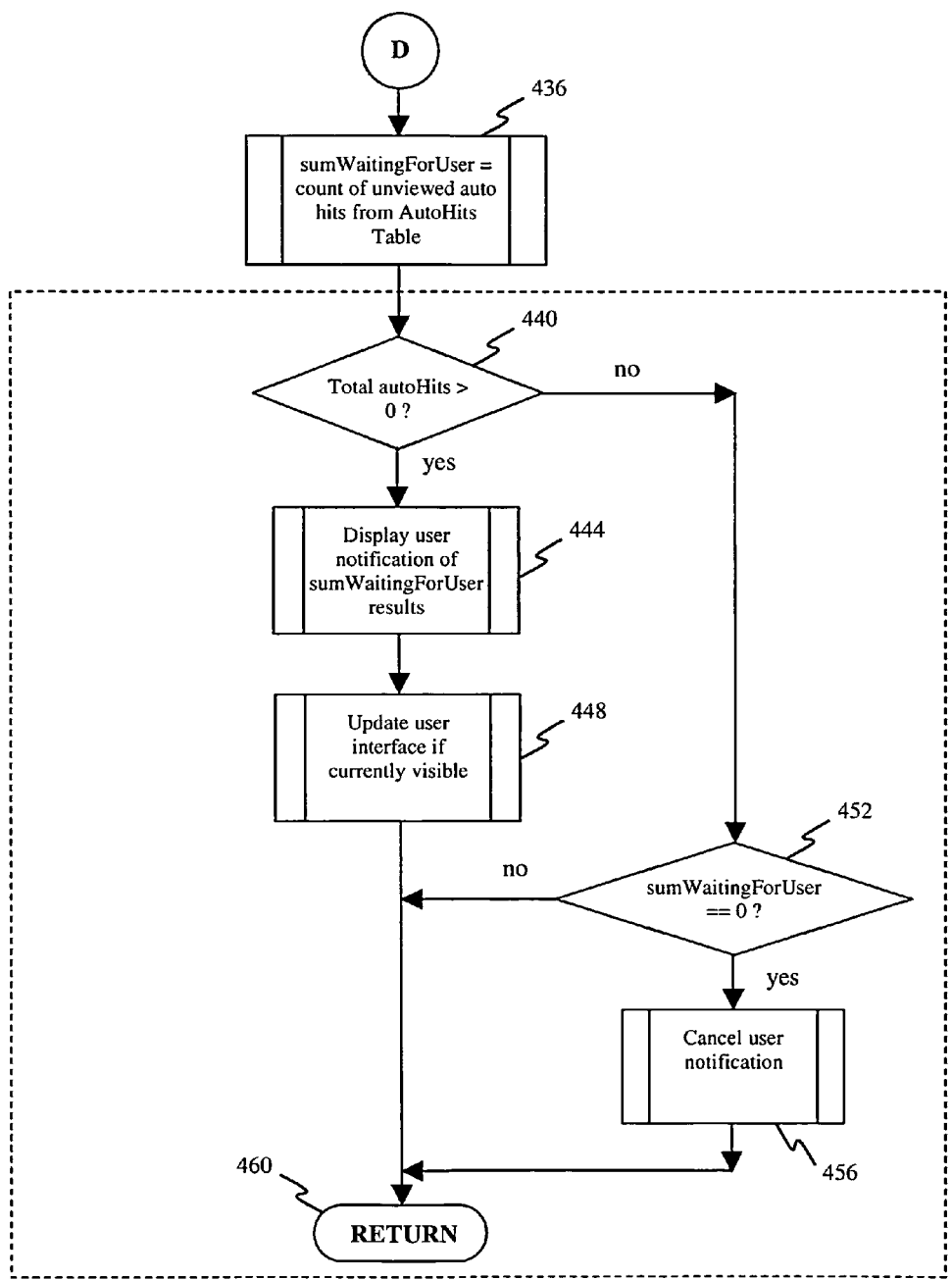

The process next starts an asynchronous thread at step 248 executing the steps from step 404 to 456 (returning to step 248 at step 460) (shown in more detail in FIGS. 4A and 4B). Step 248 will execute the background search.

Figure 3A:
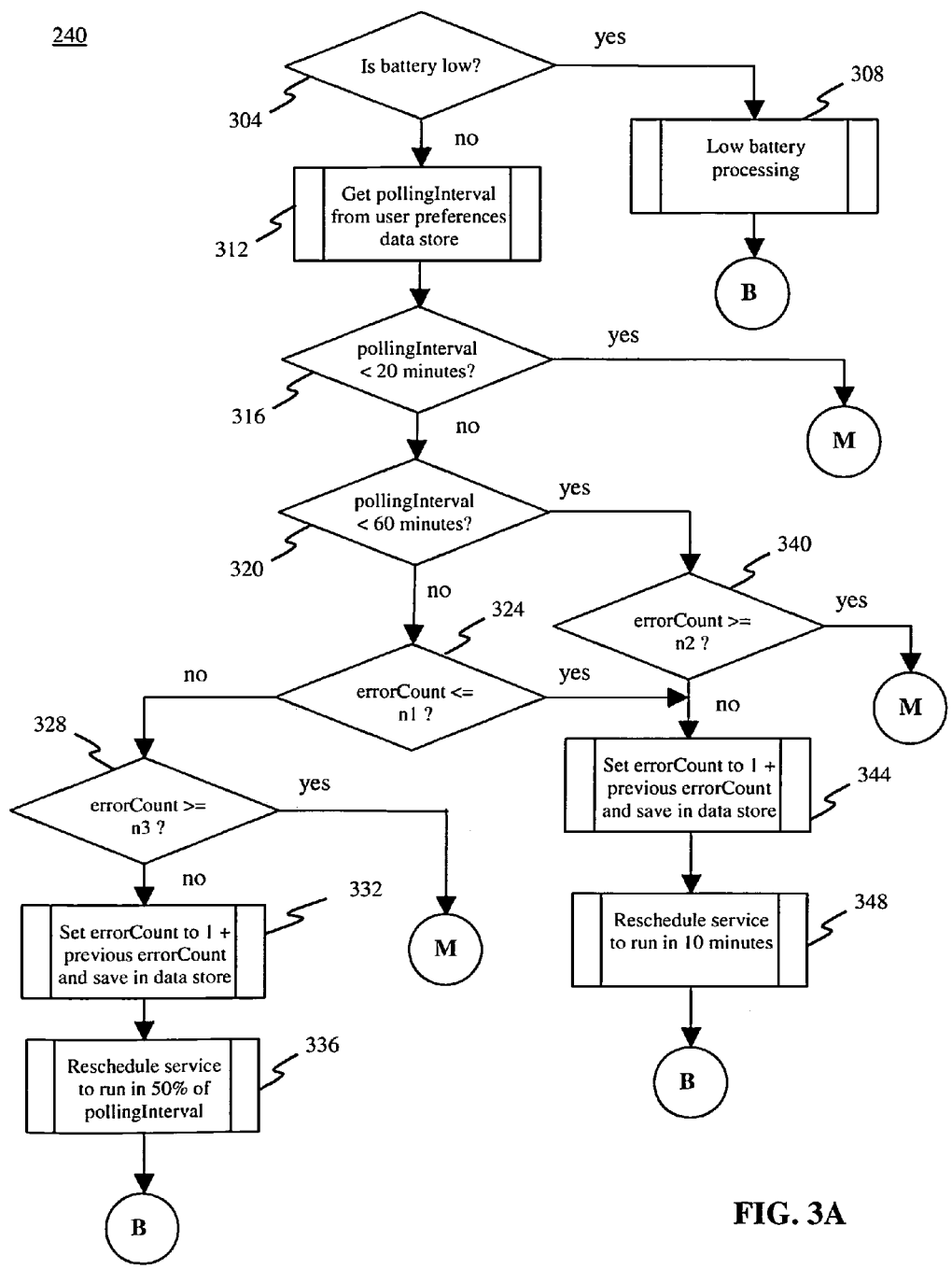
FIGS. 3A and 3B combined is a diagram of a method of process retry logic for handling battery and communication error problems.
Figure 3B:
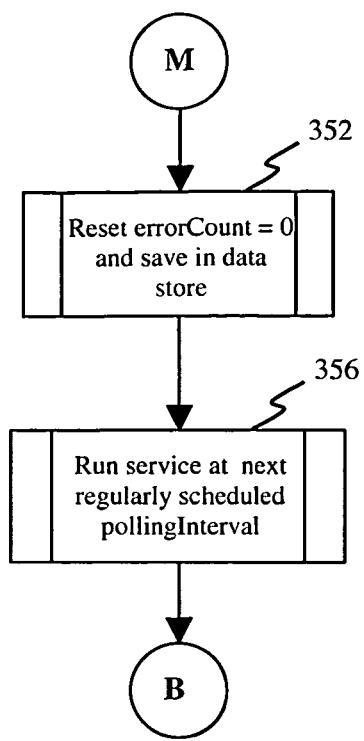

FIGS. 3A and 3B show the process retry logic executed by step 240. The goal of the process retry logic is to adjust the retry time, taking into account a user's preferred polling interval and the number of consecutive connection errors. Cellular communications can be very unreliable, depending on the user's location and radio coverage. An unsophisticated technique of repeatedly attempting to connect at set time intervals, especially at short time intervals, is wasteful of battery capacity. Also, abandoning attempts to connect after a limited number of times may miss an opportunity to reconnect when coverage is available.

Step 304 checks for low battery. If battery is low, perform low battery processing at step 308. If not, perform process retry logic (steps 312 to 356) based on polling interval and error count.

At low battery processing step 308, perform low battery processing based on charging status and capacity remaining. For example, if battery capacity is less than 50% and polling interval is less than one hour, the next attempt might be delayed until twice the polling interval. Alternatively, a lookup table can be configured with the rows representing battery life, and the columns representing the retry interval. Each cell could contain a rule determining when to retry the next search.

If battery is not low, perform get polling interval step 312; read polling interval user preference from a data store such as a database.

Step 316 determines if polling interval is less than a first threshold. For example, the first threshold might be 20 minutes Typically, server data feed is only updated at a limited time frequency (for example, 15 minutes). It would be wasteful to try more frequently than a data feed update frequency at which the first threshold is approximately set. Thus, if the user's preferred polling interval is less than the first threshold, retry at the expiration of the user's next preferred polling interval.

At step 316, it is determined if the polling interval is less than the first threshold (e.g., the polling interval is less than 20 minutes). If it is, proceed to step 352 where error count is reset and saved in a data store. Then proceed to step 356 and run the service at its next regularly scheduled polling interval. Next proceed to step 134.

Otherwise, if at step 316 the polling interval is greater than or equal to the first threshold, proceed to step 320.

At step 320, if the polling interval is less than a second threshold (e.g., less than 60 minutes), but greater than the first threshold, proceed to step 340 to check the error count else proceed to step 324. If at step 340, the error count is >=$n_2$ (e.g. $n_2$=1), the number of retry attempts has been exceeded. $n_2$ is also referred to as "first constant" in this application. Then in this case, reset the error count at step 352, save in the data store, also at step 352, and run the service polling interval at step 356. Then proceed to step 134.

If the error count is less than $n_2$ at step 340, set the error count to 1 plus the previous error count and save the error count in the save data store at step 344. Proceeding to step 348, the service is rescheduled to run at an interval that is a fraction of the polling interval (e.g. the fraction being 10 minutes). Then proceed to step 134.

If, at step 320, the polling interval is greater than or equal to the second threshold proceed to step 324. An error count less than or equal to $n_1$ (e.g. $n_1$=0), $n_1$ being less than $n_2$, means that insufficient retries have been attempted. $n_1$ is also referred to as "second constant" in this application. In this case, proceed from step 324 to step 344, where the error count is incremented and saved in the save data store. Proceeding to step 348, the service is rescheduled to run at an interval that is a fraction of the polling interval (e.g. the fraction being 10 minutes). Then proceed to step 134.

At step 324, if the error count is greater than $n_1$, proceed to step 328. At step 328, test whether number of retry attempts is greater than or equal to $n_3$, $n_3$ being greater than $n_1$ (e.g. $n_3=1$). $n_3$ is also referred to as "third constant" in this application. If the error count is greater than $n_3$, proceed to reset the error count at step 352, save in the data store (also at step 352), and run the service polling interval at step 356. Then proceed to step 134.

At step 328 if the error count is less than $n_3$, set the error count to 1 plus the previous error count and save in the data store at step 332. Proceed to step 336 where the service is rescheduled to run at some fraction (e.g. 50%) of the polling interval. Then proceed to step 134.

FIGS. 4A and 4B show a search thread that is an asynchronous task running in the background.

At step 404, if the alert service is disabled, terminate the alert at step 420 and return at step 422. If the alert service is enabled than proceed to step 408 to get a list of search request objects from a data store.

At step 412, if no search request objects were found in the data store, proceed to step 420 to terminate the alert service and return to the caller at step 422.

If, at step 412, search request objects were found in the data store, proceed to step 416 and initialize the autoHits count to zero. The autoHits count is the number of postings that are found by executing all of the search requests.

Next proceed to iterate steps 424, 428, and 432. At 424, determine if more search requests are outstanding. If not, terminate looping and proceed to step 436. Otherwise, proceed to step 428 where a search for a current search request is performed. Then increment at step 432 the autoHits by the number found from the search. Next, the process loops back to step 424.

The search and the user interface process are asynchronous, so the user can look at an autoHits table (see FIGS. 8A, 8B, and 8C and accompanying description), while the search is in progress. Therefore at step 436, a count (sumWaitingForUser) of the current unviewed autoHits is queried from the data store. Then proceed to steps 440 to 456 where the user is notified of search results. The user can be notified during background search or when the app is running in the foreground. This can be accomplished by adding a notification selector in the mobile status area, or displaying a notification widget on the user's home screen.

At step 440, a check is made to determine if the number of autoHits from the previous search iteration (steps 424, 428, and 432) is greater than zero. If the number is not greater than zero, proceed to step 452. At step 452, determine if the sumWaitingForUser is equal to zero. If the sumWaitingForUser is equal to zero, cancel at step 456 any user notification currently displayed. This can be accomplished by removing the notification selector in a status area, or by removing a notification widget in the user's home screen. Next, return to the caller at step 460. If, at step 452, the sumWaitingForUser is not equal to zero, return to the caller at step 460 without canceling the user notification.

If, at step 440, the number of autoHits is greater than zero, the process proceeds to step 444 where a user notification of sumWaitingForUser results is displayed. Then at the next step, step 448, a user interface is updated if currently visible. After step 448, at step 460, the process returns to the caller.

Figure 5A:
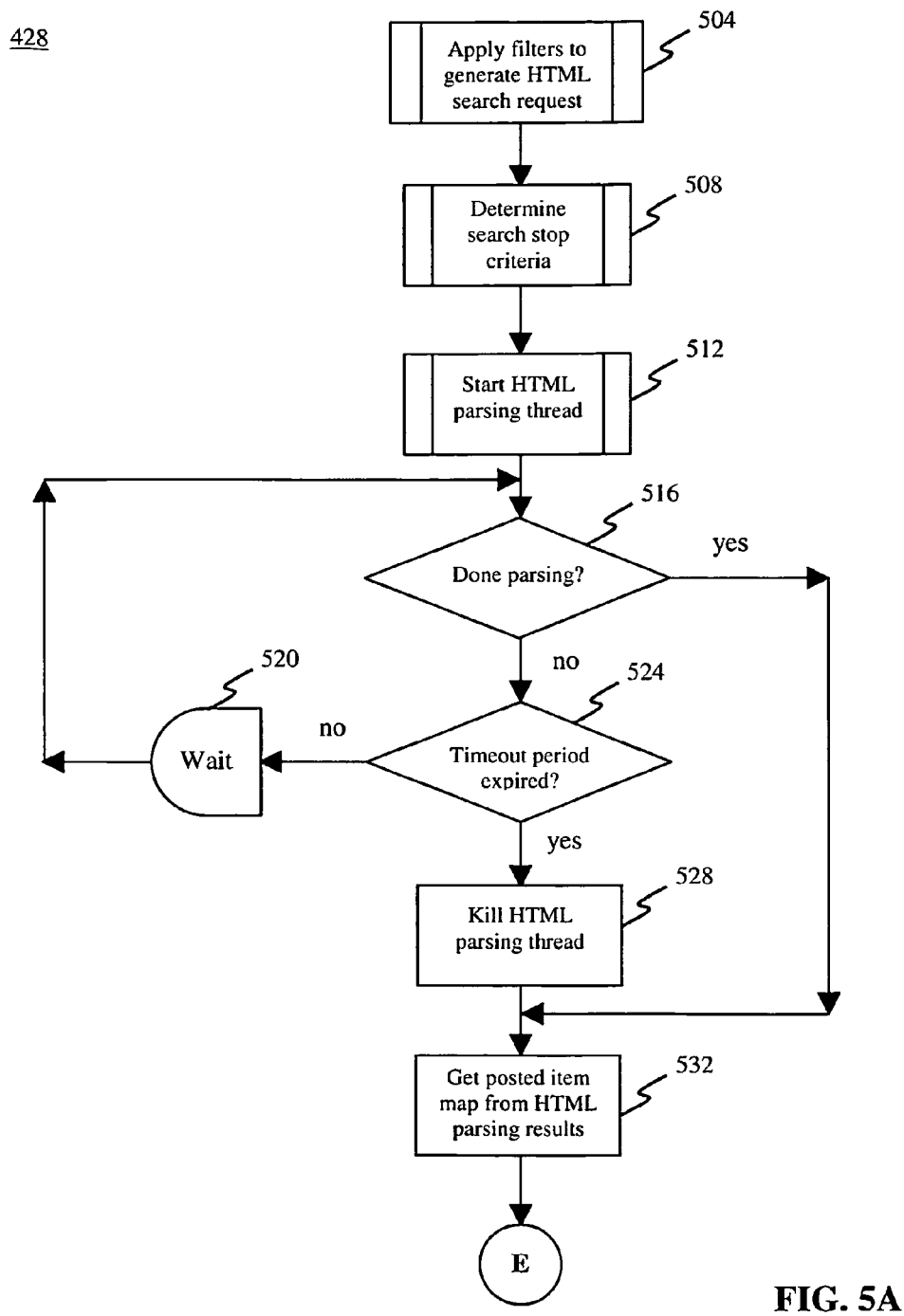
FIGS. 5A, 5B and 5C combined is a diagram of a procedure to execute a single search request.
Figure 5B:
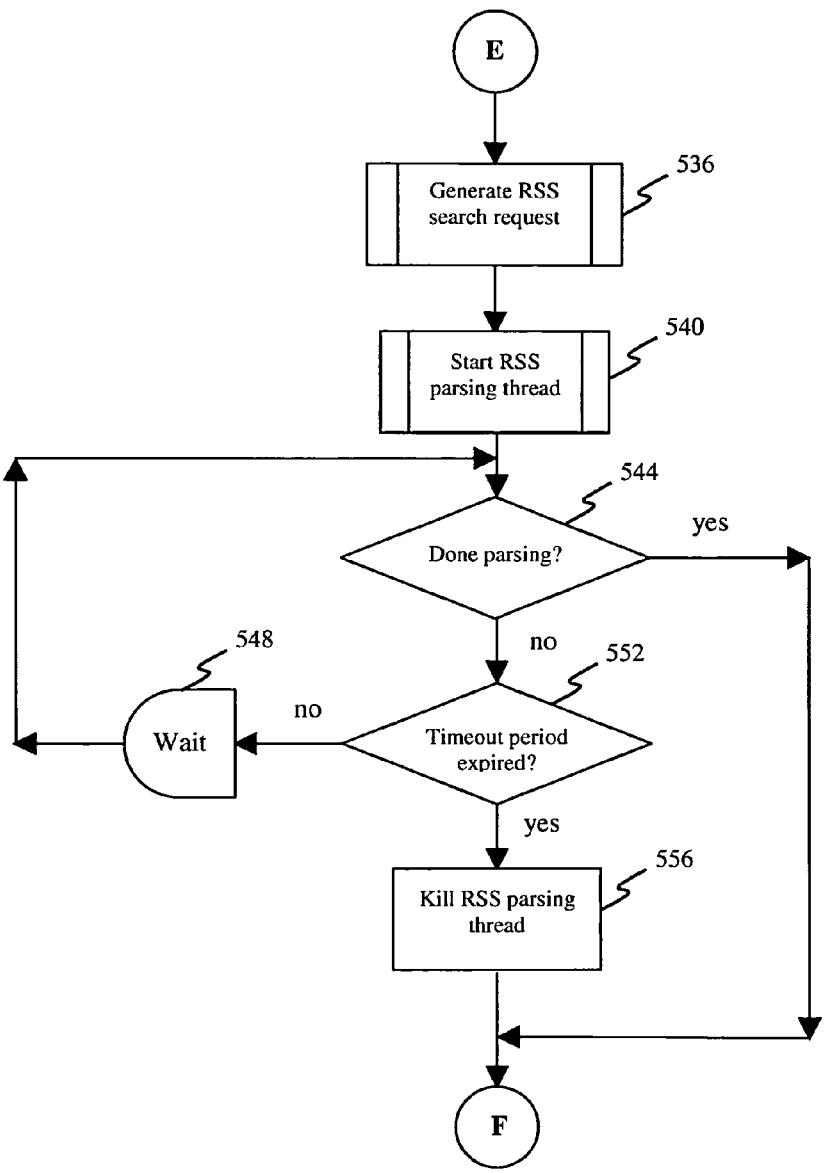
Figure 5C:
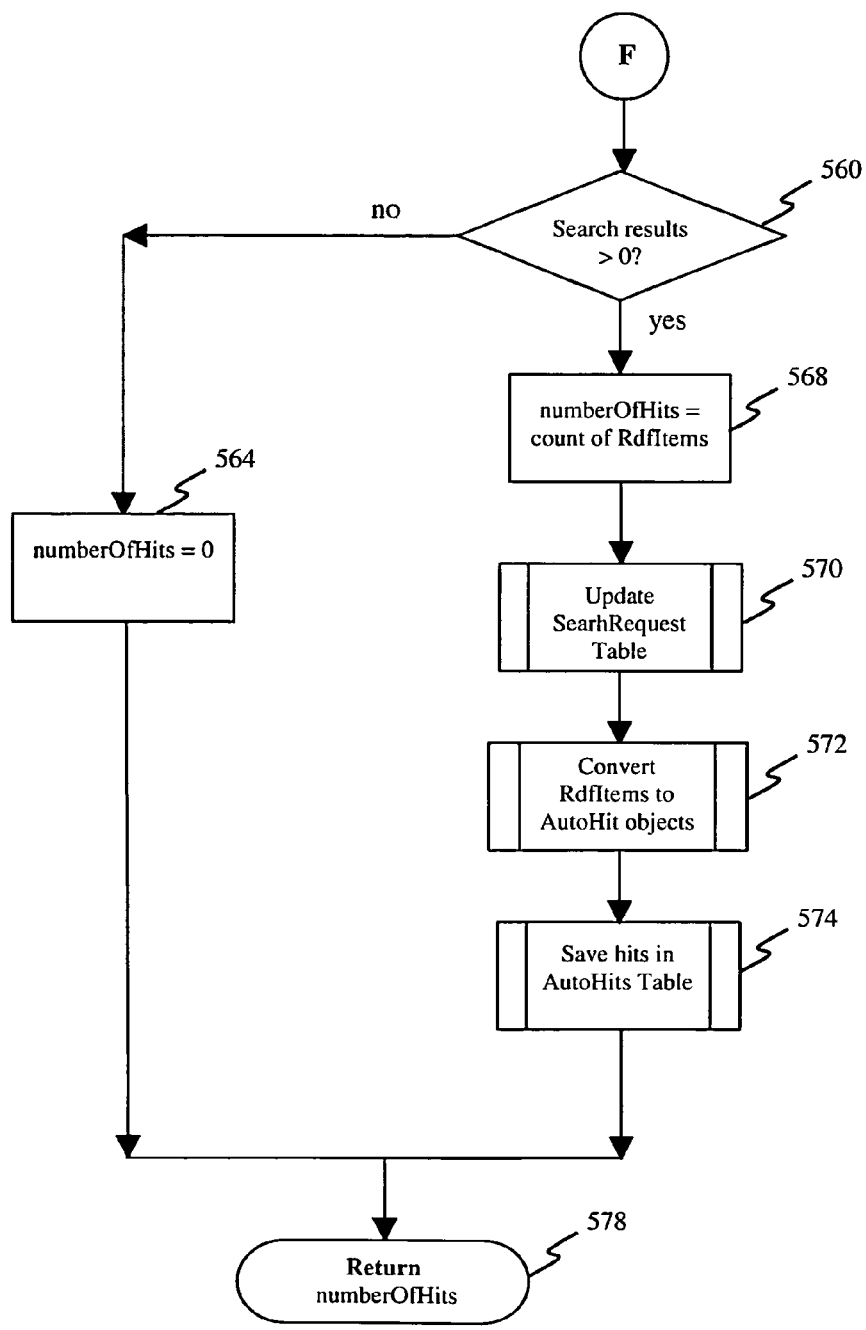

FIGS. 5A, 5B, and 5C shows the sequence of steps performed at search step 428.

The perform search 428 sequence of steps is the main procedure for executing a single search request. It can run automatically in the background at periodic time intervals, or in the foreground at the request of the user. It accepts as input a SearchRequest object defined by the user, and returns the number of resulting search hits. If search results are found, they are stored in the autoHits Table for retrieval and display by the user.

A problem to be solved by some embodiments of the present invention is that posting services publish information partly in markup language format and partly in syndicated content format.

The posting service can return posted items in both markup language and syndicated content formats. The data associated with posted items may be distributed across both formats. Some embodiments of this invention apply user-specified criteria to perform searches of posted items, to extract data published in dissimilar formats, such as markup language and syndicated content formats, to integrate the data into displayable results, and to notify the user of the results preferably on a mobile device.

The benefit of parsing markup language content, in addition to syndicated content channel, is that additional data can be extracted and associated with a posted item that is not available in syndicated content alone. For example, the posting service may host an image for a posted item that is uploaded by the user, and represented in the markup language content as a content reference. By associating this image content reference with the posted item in the syndicated content channel, time consuming parsing of syndicated content is not required to display an image thumbnail.

Figure 11:
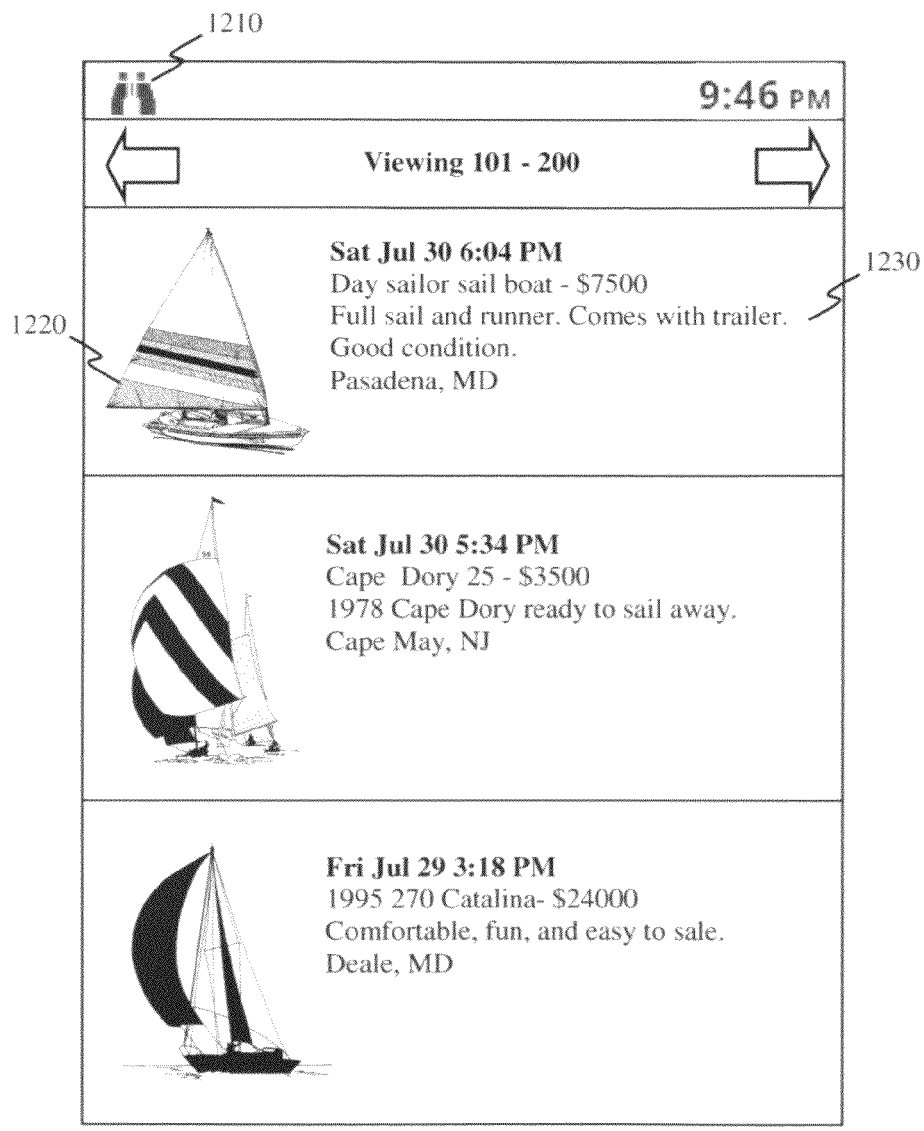
FIG. 11 is a diagram of a user interface to display and scroll through search results.

An example of a posted item, as presented to the user, is shown in FIG. 11. An item includes a posting date and time, a short description of merchandise contents 1230, and a content reference which the user can select to display detailed web content. This invention also provides a mechanism to parse item data across multiple content formats in order to generate efficiently the image thumbnail 1220 for display, preferably on a mobile device.

A "hit" is defined as a match between the search criteria specified by the user in the SearchRequest object, and a single item extracted from a list of items returned from the community/classified posting service. A match can be made based on one or more of the following criteria:

Keyword
Search category (e.g. for sale, jobs, services)
Search subcategory (e.g. boats, cars, accountant)
Time range
Filters supported by service (e.g. price ranges, age limits, square footage, etc.)

The following input variables, which are members of the SearchRequest object, are utilized by this procedure:

1. searchUrl—content reference to retrieve individual posting results.
2. lastHitTime—Calendar time of the most recent match from the previous search
3. lastHitId—Identifier for the last item that was successfully matched. The identifier can be a content reference or other string that is unique for the posting service.
4. filters A high level description for performing search 428 is as follow:

1. Apply filters to generate markup language search request (apply filters step 504)
2. Determine stop criteria step 508 for searching
3. Perform markup language search to extract a postedItemMap. The postedItemMap is a map of posting identifiers and associated posted item data which is data extracted from posting data element. The posting data element contains a posting identifier and data associated with a posting such as image content references. Other posting data element content might include an item price, a posting time, an item description, and a flag that indicates the availability of images external to the service.
4. Generate syndicated content search request
5. Perform syndicated content search until stop criteria is satisfied
6. Record hits in AutoHits table, if any. Embodiments of this invention also include a mechanism on a mobile device to store a limited number of the most recent hit results to a data store table, for future presentation to the user.

At step 504, a search request is constructed by applying the input filters to input content reference, and formatting a request for markup language content. The input content reference comprises the domain name of the search service website and any additional path and query parameters needed to execute the search. The input content reference is specific to the service being searched.

At step 508, determine the search stop criteria as described in the following pseudo code:

```
// The variables used by the parsing threads to determine when to stop
the search are:
// 1. maxHits - User specified preference for the maximum number of
search results to return
// 2. lastHitId - Identifier of the most recent posting that was found during
the previous search.
//      The background search only returns search results that haven't
been made available to the //    user from previous
background searches.
// 3. lookBackTime - Calculated calendar time that indicates how far
back in time to search
lookBackTime = –1       // Default to unlimited look back time
if (userLookBackInterval specified by user) {
    // Subtract userLookBackInterval from current time
    lookBackTime = currentTime – userLookBackInterval
    if (lastHitTime > lookBackTime) {
        // We received a hit more recent than the user specified
        // look back interval. Use the more recent time
        lookBackTime = lastHitHime
        // Subtract a small amount of time from the look back time
        // to account for any overlaps or posting errors
        lookBackTime = lookBacTime – 5 minutes
    }
}
```

Figure 6A:
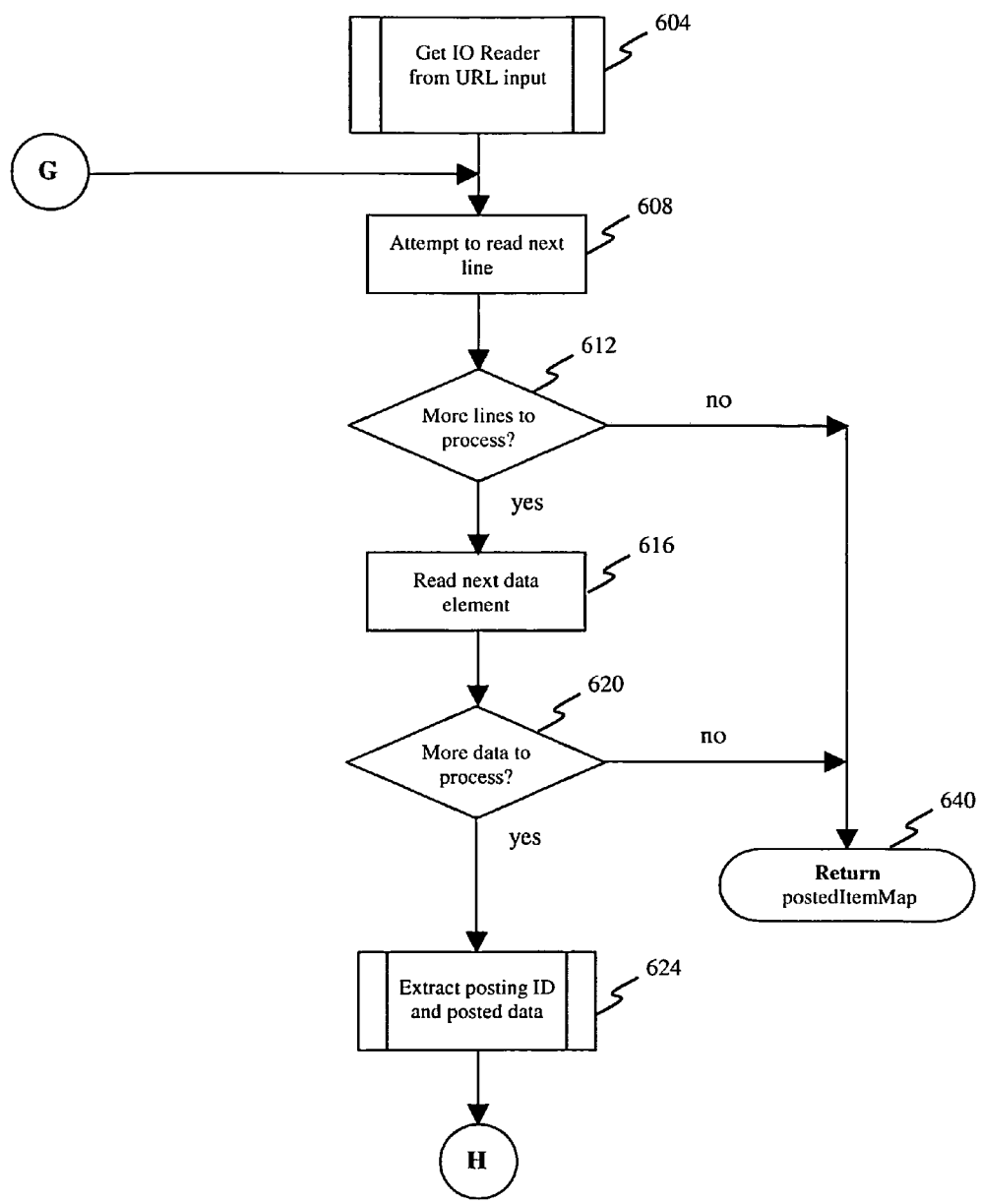
FIGS. 6A and 6B combined is a diagram of a thread to perform an markup language search of the posting service.
Figure 6B:
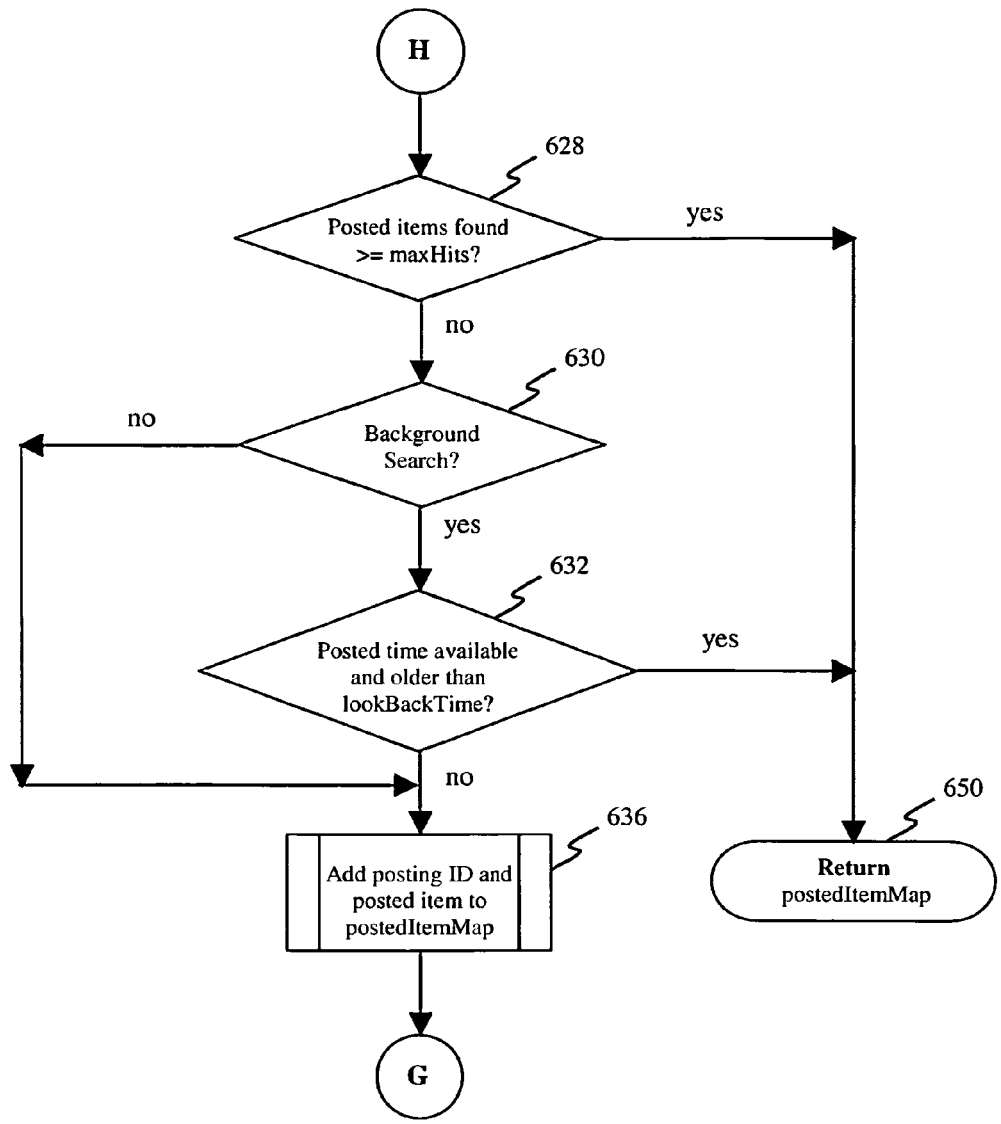
Figure 7A:
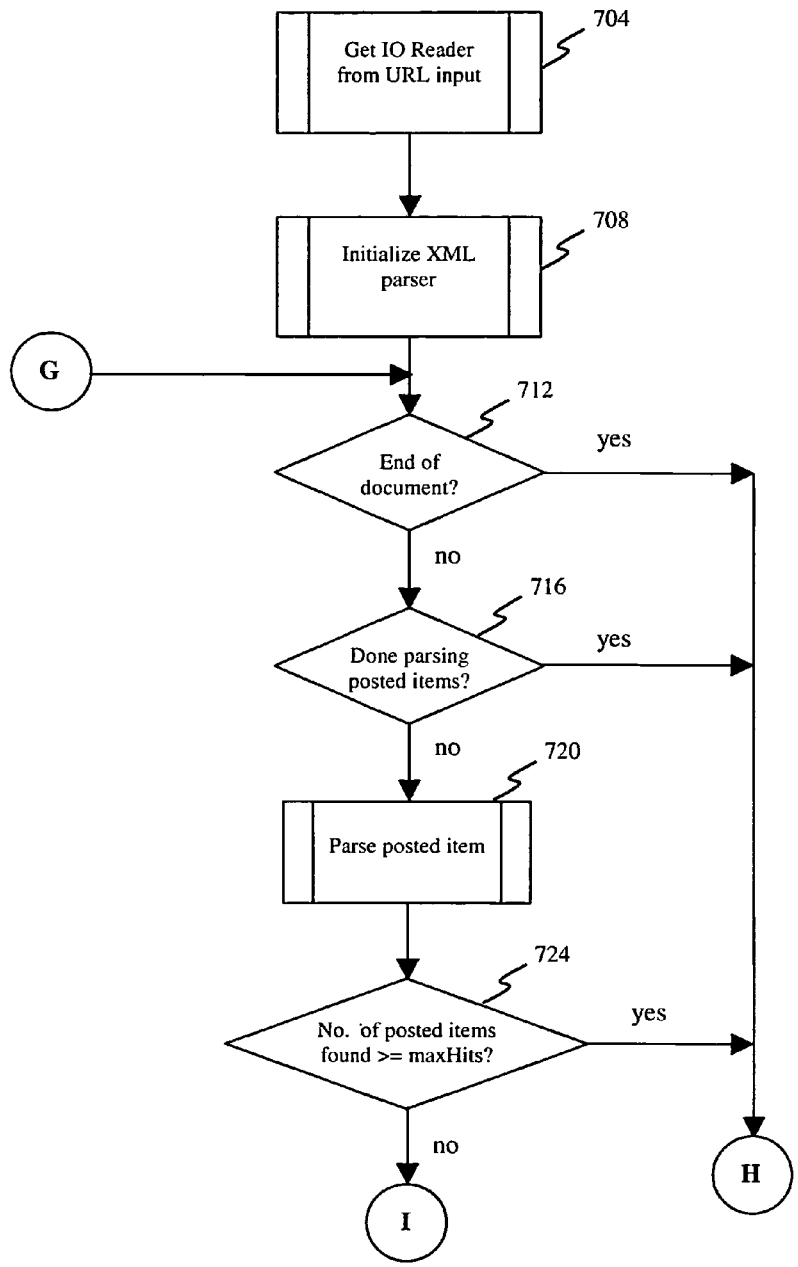
FIGS. 7A, 7B, 7C and 7D is a diagram of a thread to perform an syndicated content search of a posting service.
Figure 7B:
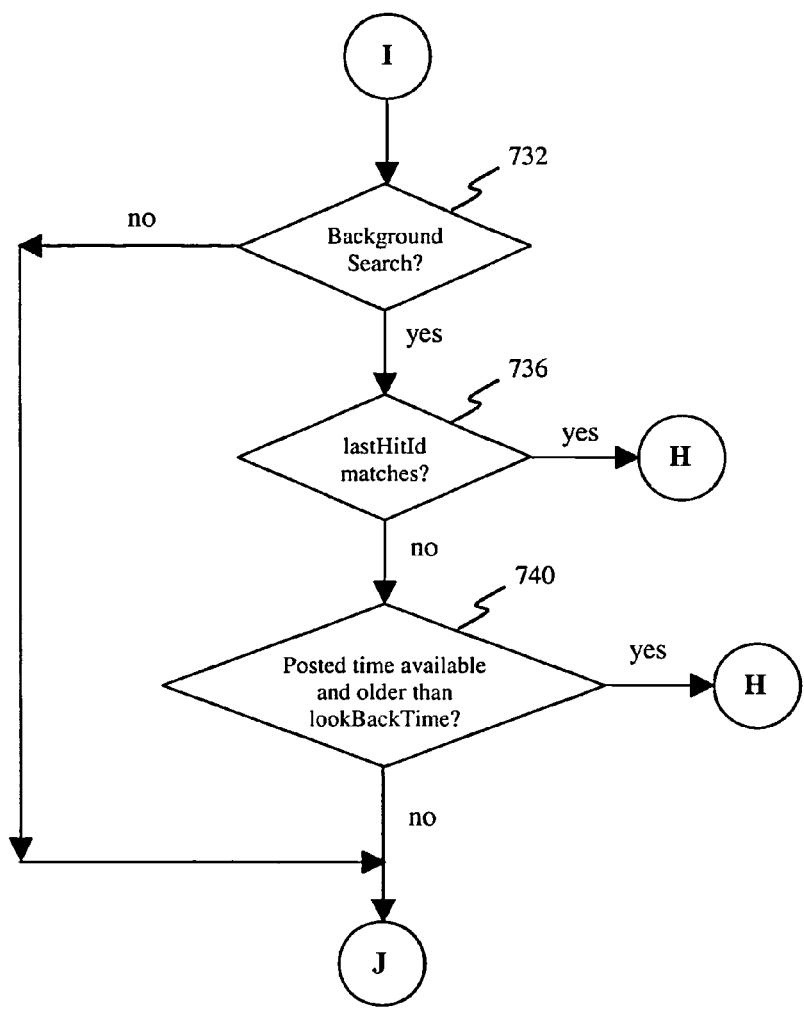
Figure 7C:
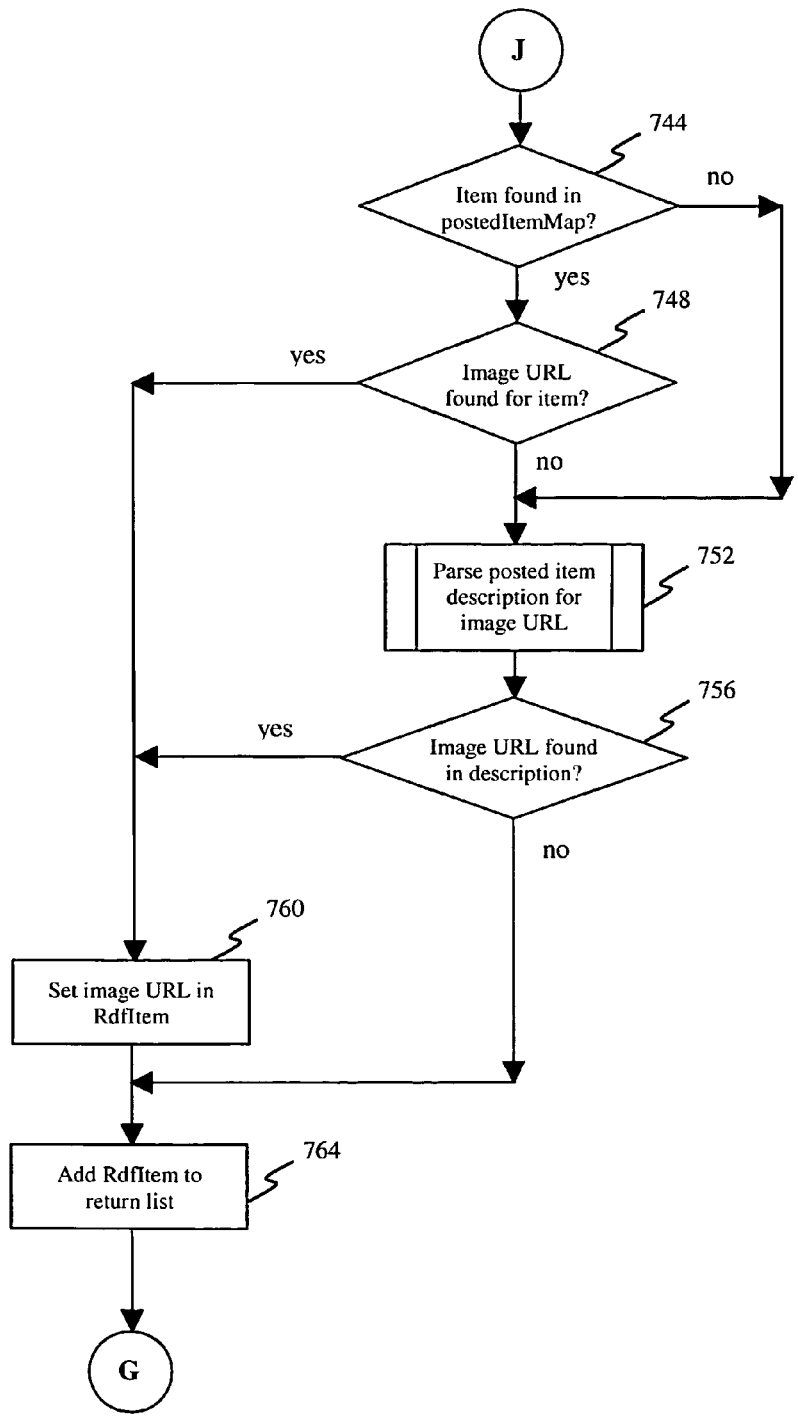
Figure 7D:
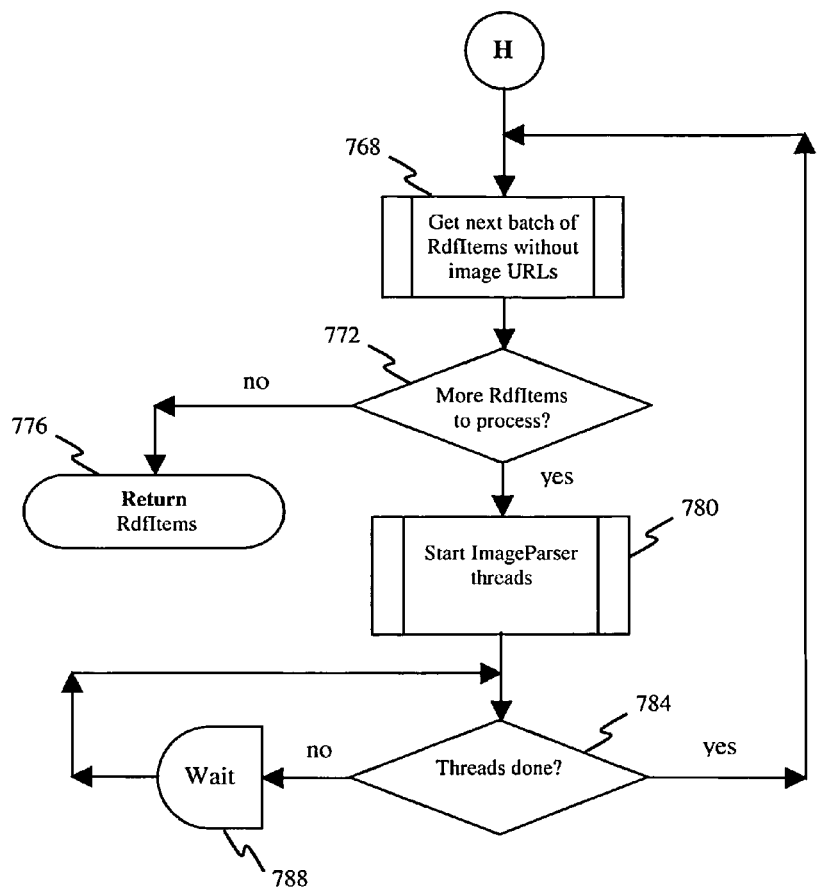

Parsing thread 512 is a sequence of steps (shown in detail in FIGS. 6A and 6B). Start an asynchronous thread that will execute the markup language search, and then execute sleep loop until the timeout has expired or the search is finished.

Next, steps 516, 520, and 524 are iterated. At step 516, decide whether parsing is completed. If completed, proceed to the step 532, exiting the loop. If not done parsing, proceed to step 524 to determine if the parsing timeout period has expired. If the timeout period has not expired, enter a wait state at step 520 and subsequently return to the start of the loop. If the timeout period has expired at step 524, exit the loop, kill the markup language parsing thread at step 528, and proceed to step 532.

At step 532, a posted item map is returned from the markup language parsing thread. It comprises the posted item identifications and associated posted data, Examples of posted data include a description, a price, or an image content reference for the item being posted.

At step 536, a syndicated content search request is initiated by formatting a request for syndicated content. The request is specific to the service being searched, but it might be constructed by appending path and query information to the input content reference.

At step 540, a syndicated content parsing thread sequence of steps (shown in detail in FIGS. 7A, 7B, 7C, and 7D) is started. Start an asynchronous thread that will execute the syndicated content search, and then proceed to the sleep wait state until the timeout has expired or the search is finished. Inputs to the syndicated content parsing thread comprise the syndicated content stop criteria and the posted item map. The posted item map comprises the results of the markup language search.

Next, steps 544, 548, and 552 are iterated. At step 544, decide whether parsing is completed. If completed, proceed to step 560 exiting the loop. If not done parsing, proceed to step 552 to determine if the parsing timeout period has expired. If the timeout period has not expired, enter a wait state at step 548 and subsequently return to the start of the loop. If the timeout period has expired at step 552, proceed to kill the markup language parsing thread at step 556 and exit the loop, proceeding to step 560.

At step 560, it is determined if there are any search results. If there are no search results, set number of hits (numberOfHits) to 0 and return the result at step 578. However, if there are search results, calculate the number of hits as the count of the number of RdfItems returned from the syndicated content parsing thread from step 540.

RdfItems contains the following data:
1. title—Short description which can be presented to the user
2. link—content reference to posted content
3. description—syndicated content description parsed from the posting
4. location—Optional geographic location of item posting
5. imageUrls—Candidate list of content references which can be used for thumbnail generation
6. time—Time item was posted If the search results are greater than 0 at step 568, calculate the number of results (numberOfHits) by determining the count of RdfItems.

Update SearchRequest table at step 570. The following input variables, members of the SearchRequest object, are utilized by this step 570:
1. searchUrl—content reference to retrieve individual posting results.
2. lastHitTime—Calendar time of the most recent match from the previous search
3. lastHitId—Identifier for the last item that was successfully matched. The identifier can be a content reference or other string that is unique for the posting service.
4. filters The SearchRequest table is updated to reflect the most recent hit, so future searches do not return the same results. The identifiers (lastHitId) and time (lastHitTime) of the most recent post found are updated in the table.

Convert RdfItems at step 572. The RdfItems returned from syndicated content parsing thread are converted to AutoHit objects, so they can be stored in the AutoHits table.

An AutoHit object comprises:
1. title—Short description which can be presented to the user
2. link—content reference to posted content
3. location—Optional geographic location of item posting
4. imageUrls—Candidate list of content references which can be used for thumbnail generation
5. time—Time item was posted
6. isNew flag—True if the user has not yet viewed the item, false otherwise.

In this case, because the items have not been view by the user, the isNew flag is set to true.

Save hits step 574 executes steps 804 to 844 (returning to step 574 at step 848) (shown in detail in FIGS. 8A and 8B). Save the hits in the AutoHits table.

The invention includes a mechanism to store a limited number of the most recent hit results to a data store table for future presentation to the user. A list of AutoHit objects is passed to this procedure. The list contains the search results, from most to least recent. Return numberOfHits, step 578.

FIGS. 6A and 6B show an markup language parser. This an expansion of the steps referred to by step 512.

At step 604, get a character reader in order to read an markup language input stream from the content reference. Next, begin iterating steps from step 608 to step 636. At step 608 attempt to read the next line from the markup language input stream. The end of the stream would typically be indicated by a negative number of bytes returned or by reading an End Of File character.

Step 612 checks to determine if there are more lines to read or data to process. If the last line has been read, return. Otherwise, read a next posting data element (defined above) at step 616.

If the posting data element is not contained on a separate line, this could be implemented by reading additional lines from the IO stream. An alternative approach would be to read the next match of a regular expression matcher.

Step 620 determines if there is more markup language data; i.e., if there are additional posting data elements. If there are no more markup language data to process, return the postedItemMap to the caller at step 640. The determination of whether there is more data to process depends on the markup language content provided by the service. One implementation would utilize a regular expression matcher to extract posted items from the markup language. If there are no more matches, the processing is completed.

If, at step 620, there are more data to process, proceed to step 624 where the posted item is extracted from markup language content. The mechanism to parse the data depends on the format of the markup language content provided by the service. One approach would utilize string matching to extract the relevant data. Another approach would use regular expression matching. A posted item identifier must be extracted from the data in order to associate this posting with the data in the syndicated content channel.

At step 628, if the number of posting items found is equal to or exceeds the maxHits stop criterion, return at step 640. If instead the number of posting items is less than the maxHits stop criterion, continue processing at step 630.

At step 630, if the search is being performed in the foreground, all posted results are desired and proceed to step 636. Otherwise, the search is being performed in the background and the process proceeds to step 632 to perform a look back time (lookBackTime) check. The check for the lookBackTime at step 632 determines if posting time is available in the posting data element. If it is available and is older than the lookBackTime stop criteria, defined above, the search is completed and proceed to return posted item map to the caller at step 650. If posting time is not available, or the posting time is more recent that the lookBackTime, proceed to step 636.

At step 636, add the posting identifier and posted item to the postedItemMap, and continue with the search by looping back to step 608.

FIGS. 7A, 7B, 7C, and 7D detail the syndicated content search (parsing) thread referred to at step 540.

The syndicated content Parsing Thread parses service contents resulting from the submission of syndicated content search request. A reader to the syndicated content stream is obtained from the search request, and each posted item is parsed until the search stop criteria (step 508) is satisfied. The stop criteria can be applicable to both the markup language search (FIGS. 6A and B) and the syndicated content search (FIGS. 7A, 7B, 7C, and 7D). Since an syndicated content feed contains structured XML content, a standard XML parser can be utilized to parse the document. A representative service might post an syndicated content channel as follows:

```
<channel>
    <title>Community/classified posting service</title>
    <link>http://samplepostingservice.com</link>
    <description>This is a sample channel for a posting
    service</description>
    <item>
        <title>Cape dory 25 - $3500</title>
        <link>http://annapolis.samplepostingservice.com/forsale/boats/</link>
        <pubDate>2011-11-06T14:41:19-05:00</pubDate>
        <description>
            <![CDATA[<p>1978 Cape Dory ready to sail away</p>]]>
        </description>
    </item>
</channel>
```

The syndicated content parsing thread is initialized with the postedItemMap obtained as a result of the markup language parsing (step 512). The postedItemMap is a map of posting identifiers and associated posted item data. The syndicated content parsing thread returns a list of RdfItems, which can be converted to AutoHit objects for storage in the AutoHits table.

At step 704, get a character reader in order to read an syndicated content input stream from the content reference. A search request is constructed by applying the input filters to the input content reference, and formatting a request for syndicated content. The input content reference comprises the domain name of the search service website and any additional path and query parameters needed to execute the search. The input content reference is specific to the service being searched.

Initialize Parser at step 708. Use a standard XML parser, such as a pull parser.

Next iterate the steps from step 712 to step 764. First, at step 712, check if the end of the XML document has be reached. If the end of XML document has been reached, exit loop to step 768 for post-processing of the RdfItems. Otherwise, continue processing at step 716.

At step 716, a determination is made if parsing of the posted items is completed. If parsing is completed, exit loop and proceed to step 768 for post-processing of the RdfItems. Otherwise, continue processing to step 720 to parse the next posted item. See above for an example of the syndicated content format to be parsed. Data items to be parsed include:
1. title—Short description which can be presented to the user
2. link—content reference to posted content
3. description—A more detailed description of the posting. This can include markup language content for display on a web page
4. date—The date the item was posted Proceed to step 724 to determine if the number of items parsed so far is greater than or equal to maxHits. If the number of posting items found equals or exceeds the maxHits stop criteria, exit loop to step 768 for post-processing of the RdfItems. Otherwise, continue processing at step 732.

If searching in the background at step 732, the lastHitId and lookBackTime stop criteria will be applied and proceed to step 736. If searching in the foreground, ignore the stop criteria and proceed to step 744.

At step 736, if the lastHitId matches the identifier from the parsed item, exit loop to step 768 for post-processing of the RdfItems. Otherwise, continue processing at step 740.

At step 740, if a posting time was extracted from the posted item and the item that is currently being parsed is older the lookBackTime stop criteria, exit loop to step 768 for post-processing of the RdfItems. Otherwise, proceed to step 744.

At step 744, use the identifier of the posted item as a lookup key to the postedItemMap. If an entry exists, the same item was previously processed from the markup language processing thread; proceed to step 748. At step 748, if the item previously processed from the markup language processing thread contains an image content reference, it is not necessary to continue to parse additional content. This saves considerable processing in locating a suitable image content reference from which to generate a thumbnail. If an image content reference is not available, syndicated content description element will be searched.

If an entry does not exist at step 744, go to step 752 to parse the posted item description for image content references. The syndicated content description data can contain markup language content that was posted by the service user. The content can be parsed to find a list of candidate images that would make suitable thumbnails. Images that would not make suitable thumbnails are not added to the list. When the AutoHit items are displayed for the mobile user, this reduces the processing needed to display a thumbnail. The parsing procedure at step 752 to find a list of candidate image content references is described in the following pseudo-code:

```
Create regular expression matcher to locate image links
Apply regular expression to markup language content
while there are more matches and number of matches
< MAX_THUMBNAILS_TO_TRY {
    Get next link from matcher
    Extract image resource name from link
    if resource name indicates image would make a bad thumbnail {
        // e.g. spacer.gif, blank.gif, etc.
        continue
    }
    if link is not a valid content reference {
        continue
    }
    Extract width and height attributes from image tag
    if width and height are available {
        Calculate aspect ratio of image
        if aspect ratio is too big or too small {
            // The image is most likely some type of
            // formatting element, such as a spacer - ignore
            continue
        }
    }
    Add image to list of candidates
}
return candidate list of images
```

If at step 756, one or more candidate images were found in syndicated content description, the candidate images are stored in the RdfItem, at step 760, which is then added to the return list, at step 764. If one or more images were not found at step 756, bypass step 760 and proceed to step 764. At step 764, add RdfItems to a return list and loop back to step 712.

Referring back to step 748, if an image content reference is found proceed to step 760 (described above). If an image content reference is not found at step 748, execute the steps described in step 752 (see above).

Some of the RdfItems in the return list may not have image content references associated with them. This can occur when both the markup language parser and syndicated content description parser fail to find candidate images. In this case, the contents pointed to by the link in the RdfItem will also be searched for candidate images. As a performance optimization, the links to search will be grouped into small batches so they can be executed concurrently. Typically, mobile devices can only process a few concurrent connections at a time. This number can be optimized for the specific device and communications network being utilized.

To accomplish the above, post-processing is conducted starting at step 768 (routed to there from steps 712, 716, 724, 736, and 740). Step 768 is the start of a loop: steps 768, 772, 780, 784, and 788. At step 768, get a next batch of RdfItems which do not contain content references. This can be accomplished by conducting a linear search through the RdfItems to find items without image content references.

At step 772, if there are no more batches to process, exit the loop and return the list of RdfItems to the caller at step 776. Otherwise, at step 780 start one ImageParser thread for each RdfItem in the batch. The link in each RdfItem represents a detailed posting by a service user. The contents pointed to by the link can be parsed for a list of candidate thumbnail images. One ImageParser thread will be created for each link in the batch of RdfItems. The ImageParser thread will open an IO reader from the link content reference, and then utilize the method specified in parse syndicated content description step 752 to parse image links.

At step 784, if all the threads in the current batch are not done, proceed to step 788 to wait. Otherwise, proceed to step 768 to get the next batch to process. The completion of the threads can be coordinated by a countdown latch object, or other similar thread synchronization mechanism.

Steps 574 and 122 utilize the logic shown in FIGS. 8A and 8B.

At step 804, a data store transaction begins. This procedure assumes the existence of a transactional data store on the device. The data store operations in this procedure should be atomic, and a mechanism should be available to roll back the transactions if a failure occurs.

At step 808, count the number of rows (numOfRows) in the AutoHits Table, by executing a query against the data store.

At step 812, the number of open slots (openSlots) is calculated by subtracting the numOfRows from a capacity of the AutoHits Table. Capacity is the maximum number of rows that the table can grow to. The capacity is a tradeoff between memory utilization on the mobile device and the number of prior hits available to the user.

At step 816, a count of the number of AutoHits (nRecords) being inserted into the table is determined from the list of AutoHit objects passed into this procedure.

At step 820, determine if nRecords>capacity of the AutoHits table. If the number of records being inserted into the table is greater than the capacity, proceed to step 832 which deletes all of the existing records in the AutoHits table. Then proceed to step 836.

At step 836, the number of records being inserted is greater than the capacity of the table, so the oldest records can't be accommodated. The list of records being inserted is ordered from most to least recent, so the excess number of records (capacity−nRecords) is removed from the end of the list. Then proceed to step 840.

If, at step 820, the number of records being inserted into the AutoHits table is less than or equal to the capacity of the AutoHits table, proceed to step 824 to determine if nRecords is greater than openSlots.

At step 824, if nRecords is greater than openSlots, proceed to step 828 to make room in the AutoHits table by removing the oldest records. The AutoHits Table is ordered from the least recent postings to most recent. Additional room is made in the table by removing the oldest entries at the top, thereby creating room to add the newest entries at the bottom. This is done without increasing the capacity. The number of records to remove is calculated by (nRecords−openSlots). This number of records can be removed from the beginning of the table by executing a query. After executing 828, proceed to 840.

If, at step 824, nRecords is less than or equal to the openSlots, it is not necessary to make additional room in the AutoHits table and step 828 can be bypassed, proceeding instead to step 840.

By the time step 840 is executed, there is enough room in the table to insert the records. Since the table is ordered from least to most recent postings, but the list of records being inserted is ordered from most to least recent, the records are inserted in reverse order. Proceeding to step 844, queries executed in this procedure are committed to the data store. After step 844, return to the caller at step 848.

Those skilled in the art will recognize that the present invention has been described in terms of exemplary embodiments based upon use of a programmed processor (e.g., digital processing apparatus 1000). However, the invention should not be so limited, since the present invention could be implemented using hardware component equivalents such as special purpose hardware and/or dedicated processors that are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention. Moreover, although the present invention has been described in terms of a general purpose personal computer providing a playback mechanism, the playback can be carried on a dedicated machine without departing from the present invention. Conversely, the present decoder has been described in terms of a state machine and such state machine can be implemented as either a hardware or software based state machine. Moreover, those skilled in the art will understand that the exact register configurations, PID protocols and other details described in connection with the above exemplary embodiment should not be considered limiting, but are presented by way of illustration.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium or transmitted over any suitable electronic communication medium or otherwise be present in any computer readable or propagation medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any computer readable medium, transmission medium, storage medium or propagation medium including, but not limited to, electronic storage devices such as those described above, as well as carrier waves, electronic signals, data structures (e.g., trees, linked lists, tables, packets, frames, etc.) optical signals, propagated signals, broadcast signals, transmission media (e.g., circuit connection, cable, twisted pair, fiber optic cables, waveguides, antennas, etc.) and other media that stores, carries or passes the code and/or data. Such media may either store the software code and/or data or serve to transport the code and/or data from one location to another.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as falling within the scope of the appended claims.

APPENDIX

The Appendix, submitted on a computer readable medium, forms a part of the patent application entitled "Method and Apparatus to Search Data and Notify and Update a User."

This Appendix, which is hereby incorporated by reference herein in its entirety, includes computer programming code in the JAVA language. It should be recognized, however, that this code is not meant to limit the scope of the invention, but only to provide details for a specific embodiment. This Appendix includes the Appendix incorporated by reference above from U.S. Provisional Application No. 61/458,442, filed Nov. 23, 2010 entitled "Method and Apparatus to Search Data and Notify and Update a User," which is hereby incorporated by reference herein in its entirety.

REFERENCE TO COMPUTER PROGRAM LISTING APPENDICES

Computer program listing appendix on compact disc-recordable (CD-R), corresponding to the program listings discussed below, is filed herewith, in accordance with 37 C.F.R. 1.52(e). This computer program listing appendix is incorporated herein by reference in its entirety, in accordance with 37 C.F.R. 1.77(b)(4). The aforementioned compact disc was created on Nov. 15, 2011 and is a copy of a compact disc created on Nov. 22, 2010 submitted as an appendix to U.S. Provisional application No. 61/458,442 filed Nov. 23, 2010 by Larry Deutsch, which application and appendix are incorporated by reference in their entirety.

The files on CD-R are identified as follows:

| File Name | Size | Date |
| --- | --- | --- |
| Address.java | 3,439 | 11/22/2010 |
| AppPreferenceActivity.java | 5,219 | 11/22/2010 |
| AutoHit.java | 6,500 | 11/22/2010 |
| BoundedLruCache.java | 2,274 | 11/22/2010 |

-continued

| File Name | Size | Date |
|---|---|---|
| Categories.java | 9,255 | 11/22/2010 |
| CheckBoxPreferenceWithLongSummary.java | 1,557 | 11/22/2010 |
| clear_data_dialog.xml | 2,182 | 11/22/2010 |
| ClearDataPreference.java | 10,621 | 11/22/2010 |
| colors.xml | 651 | 10/30/2010 |
| Constants.java | 6,415 | 11/22/2010 |
| Contact.java | 3,147 | 11/22/2010 |
| ContactAPI.java | 2,095 | 11/22/2010 |
| ContactAPI3.java | 7,048 | 11/22/2010 |
| ContactAPI5.java | 8,878 | 11/22/2010 |
| ContactList.java | 1,218 | 11/22/2010 |
| CraigslistHtmlParser.java | 11,371 | 11/22/2010 |
| CraigslistUrl.java | 5,889 | 11/22/2010 |
| custom_dialog.xml | 2,267 | 11/22/2010 |
| CustomAlertDialog.java | 5,081 | 11/22/2010 |
| Database.java | 25,798 | 11/22/2010 |
| Email.java | 1,962 | 11/22/2010 |
| FinditAlertService.java | 8,645 | 11/22/2010 |
| FinditApplication.java | 6,479 | 11/22/2010 |
| FinditServiceConnection.java | 3,340 | 11/22/2010 |
| FinditServiceReceiver.java | 1,375 | 11/22/2010 |
| HtmlParsingResults.java | 1,573 | 11/22/2010 |
| ImageDownloader.java | 22,606 | 11/22/2010 |
| ImageUrl.java | 1,430 | 11/22/2010 |
| Iso8601DateParser.java | 2,433 | 11/22/2010 |
| item_web_view.xml | 1,029 | 11/22/2010 |
| LineReader.java | 3,818 | 11/22/2010 |
| list_item_icon_text.xml | 1,319 | 11/22/2010 |
| list_item_text.xml | 1,103 | 11/22/2010 |
| location.xml | 2,586 | 11/22/2010 |
| LocationActivity.java | 25,128 | 11/22/2010 |
| LocationRecord.java | 5,768 | 11/22/2010 |
| Locations.java | 22,742 | 11/22/2010 |
| map_result_dialog.xml | 3,176 | 11/22/2010 |
| number_picker.xml | 1,634 | 10/17/2010 |
| NumberPicker.java | 14,049 | 11/22/2010 |
| NumberPickerButton.java | 2,527 | 09/19/2010 |
| Phone.java | 1,888 | 11/22/2010 |
| Range.java | 2,107 | 11/22/2010 |
| RdfItem.java | 7,328 | 11/22/2010 |
| RdfParser.java | 26,178 | 11/22/2010 |
| review_list.xml | 1,285 | 11/22/2010 |
| ReviewSearchResults.java | 47,293 | 11/22/2010 |
| save_result_dialog.xml | 5,499 | 11/22/2010 |
| save_search_dialog.xml | 3,896 | 11/22/2010 |
| saved_overview.xml | 6,162 | 11/22/2010 |
| SavedActivity.java | 54,731 | 11/22/2010 |
| search_criteria.xml | 2,887 | 11/22/2010 |
| SearchCriteria.java | 26,016 | 11/22/2010 |
| SearchItemAdapter.java | 6,302 | 11/22/2010 |
| SearchRequest.java | 8,134 | 11/22/2010 |
| SearchResult.java | 5,908 | 11/22/2010 |
| SearchTabActivity.java | 2,507 | 11/22/2010 |
| sendto.xml | 4,325 | 11/22/2010 |
| ServiceCallable.java | 1,164 | 11/22/2010 |
| ServiceTimerTask.java | 13,675 | 11/22/2010 |
| spinner_view.xml | 888 | 11/22/2010 |
| spinner_view_dropdown.xml | 891 | 11/22/2010 |
| strings.xml | 16,669 | 11/22/2010 |
| StyleableSpannableStringBuilder.java | 1,789 | 11/22/2010 |
| styles.xml | 1,517 | 11/18/2010 |
| TimePickerPreference.java | 11,691 | 11/22/2010 |
| ToggleButtonGroupTableLayout.java | 2,767 | 11/22/2010 |
| UrlParam.java | 1,594 | 11/22/2010 |
| Utils.java | 26,315 | 11/22/2010 |
| ViewItem.java | 18,256 | 11/22/2010 |

I claim:

1. A digital processing apparatus comprising:
an operating system; and
a control logic, in communication with the operating system, comprising a content parsing logic engine in communication with a posting site via the operating system;
wherein:
the content parsing logic engine generates a content reference comprising a domain name and further comprising query parameters and path parameters based on user parameters;
the content parsing logic engine accesses the posing site employing the domain name and the path parameters of the content reference;
the content parsing logic engine uses the content reference query parameters to execute a first query on the posing site to extract markup language content;
the content parsing logic engine parses the markup language content to generate a map to map item identifiers to respective item data;
the content parsing logic engine uses the content reference query parameters to execute a second query on the posting site to extract syndicated content;
the content parsing logic engine updates the item data with the syndicated content resulting in a modification of the map;
the content parsing logic engine determines a number of search results to present to a user; and
the number of search results to present to the user are search results posted no earlier than a maximum look-back interval from a current time wherein the maximum look-back interval is determined by:
specifying a first look-back interval;
adding a specified correction interval to the first look-back interval;
calculating a second interval as a time since a most recent posting from a prior search; and
selecting the maximum look-back interval as the shorter of the first interval and the second interval.

2. The digital processing apparatus of claim 1 further comprising:
a query engine in communication with a data store; and
the content parsing logic engine in communication with the query engine;
wherein the content parsing logic engine passes the modification of the map to the query engine; and
the query engine saves the modification of the map in the data store.

3. The apparatus of claim 1 wherein a user is notified of the modification of the map via the passing of the modification of the map to an output channel of the operating system.

4. The apparatus of claim 1 wherein the user parameters are stored in a data store and wherein a query engine obtains the user parameters from the data store to pass the user parameters to the content parsing engine.

5. The apparatus of claim 1 wherein the apparatus is at least one selected from the group consisting of cellular telephone, notebook computer, tablet computer, and laptop computer.

6. The apparatus of claim 1 wherein the content parsing logic engine 1465 comprises pull logic.

7. The apparatus of claim 1 wherein the item data 1460 comprises an AutoHits table comprising:
zero or more rows up to a maximum number each containing one prior search result wherein the rows are ordered from least recent to most recent prior search result.

8. The apparatus of claim 7 wherein a combination of the results of the first query and the results of the second query results in a set of current search results.

9. The apparatus of claim 8 wherein:
if the number of rows each containing the one prior search result plus the number of current search results in the set is less than or equal to the maximum number then a query engine creates rows such that:

the total number of rows is less than or equal to the maximum number;
the total number of rows is equal to the number of rows each containing the one prior search result plus the number of current search results;
the query engine inserts each current search result into a respective created row; and
the AutoHits table is in least recent to most recent order of search results.

10. The apparatus of claim 8 wherein if the number of current search results is greater than or equal to the maximum number; then
a query engine deletes all rows if the number of rows is greater than zero;
the query engine creates rows equal to the maximum number; and
the query engine inserts each member of a subset of the set of current search results into a respective row such that the AutoHits table is in least recent to most recent order;
wherein the subset is equal to the number of created rows and the subset contains the most recent current search results.

11. The apparatus of claim 8 wherein:
if the number of rows containing prior search results plus the number of current search results is greater than the maximum number;
if the number of current search results is less than the maximum number; then
an available number of putative rows is equal to the maximum number minus the number of prior search results;
the query engine deletes a number of rows equal to the current search results minus the available number of rows such that the AutoHits table contains the most recent prior search results; and
the query engine creates rows equal to the number of current search results;
the query engine inserts current search results into respective created rows such that the AutoHits table is in least recent to most recent order.

12. A digital processing apparatus implemented method for coordinating data from dissimilar formats comprising:
communicating between a content parsing logic engine and an operating system;
communicating between the operating system and a posting site;
generating a content reference, comprising a domain name and further comprising query parameters and path parameters based on user parameters, via the content parsing logic engine;
using the content reference to execute a first query on the posting site to extract markup language content via the content parsing logic engine;
parsing the markup language content to generate a map to map item identifiers with respective item data via the content parsing logic engine;
using the content reference to execute a second query on the posting site to extract syndicated content via the content parsing logic engine;
updating the item data with the syndicated content resulting in a modification of the map via the content parsing logic engine; and
determining a number of search results to present to a user via the content parsing logic engine;
wherein the number of search results to present to the user are search results posted no earlier than a maximum look-back interval from a current time wherein the maximum look-back interval is determined by:
specifying a first look-back interval;
adding a specified correction interval to the first look-back interval;
calculating a second interval as a time since a most recent posting from a prior search; and
selecting the maximum look-back interval as the shorter of the first interval and the second interval.

13. The method of claim 12 further comprising:
a query engine in communication with a data store;
the content parsing logic engine in communication with the query engine;
passing the modification of map to the query engine via the content parsing logic engine; and
saving the modification of map in the data store via the query engine.

14. The apparatus of claim 1 wherein the number of search results to present to the user are search results posted no earlier than a maximum look-back interval from a current time.

15. The apparatus of claim 1 wherein the number of search results to present to the user are no more than a maximum number of search results requested by the user.

16. The apparatus of claim 1 wherein the number of search results to present to the user are search results posted later than a most recent item found from a prior search.

17. The method of claim 12 wherein a user is notified of the modification of map via the passing of the modification of map via the content parsing logic engine to an output channel of the operating system.

18. The method of claim 12 wherein the user parameters are stored in a data store and wherein a query engine obtains the user parameters from the data store to pass the user parameters to the content parsing engine 1465.

19. The method of claim 12 wherein the apparatus is at least one selected from the group consisting of cellular telephone, notebook computer, tablet computer, and laptop computer.

20. A non-transitory data processing apparatus readable storage medium storing a program for causing a data processing apparatus to execute a method comprising:
communicating between a content parsing logic engine and an operating system;
communicating between the operating system and a posting site;
generating a content reference, comprising a domain name and further comprising query parameters and path parameters based on user parameters, via the content parsing logic engine;
using the content reference to execute a first query on the posting site to extract markup language content via the content parsing logic engine;
parsing the markup language content to generate map to map item identifiers with respective item data via the content parsing logic engine;
using the content reference to execute a second query on the posting site to extract syndicated content via the content parsing logic engine;
updating item data with syndicated content resulting in a modification of map via the content parsing logic engine; and
determining a number of search results to present to a user via the content parsing logic engine;
wherein the number of search results to present to the user are search results posted no earlier than a maximum look-back interval from a current time wherein the maximum look-back interval is determined by:
specifying a first look-back interval;

adding a specified correction interval to the first look-back interval;

calculating a second interval as a time since a most recent posting from a prior search; and selecting the maximum look-back interval as the shorter of the first interval and the second interval.

21. The non-transitory data processing apparatus readable storage medium of claim 20 for storing a program for causing a data processing apparatus to execute a method wherein a user is notified of the modification of map via the passing of the modification of map via the content parsing logic engine to an output channel of the operating system.

22. The non-transitory data processing apparatus readable storage medium of claim 20 for storing a program for causing a data processing apparatus to execute a method wherein the user parameters are stored in a data store and wherein a query engine obtains the user parameters from the data store to pass the user parameters to the content parsing engine.

23. The non-transitory data processing apparatus readable storage medium of claim 20 for storing a program for causing a data processing apparatus to execute a method wherein the apparatus is at least one selected from the group consisting of cellular telephone, notebook computer, tablet computer, and laptop computer.

24. The non-transitory data processing apparatus readable storage medium of claim 20 for storing a program for causing a data processing apparatus to execute a method further comprising:

a query engine in communication with a data store;

the content parsing logic engine in communication with the query engine;

passing the modification of map to the query engine via the content parsing logic engine; and saving the modification of map in the data store via the query engine.

* * * * *